(12) United States Patent
Okabe et al.

(10) Patent No.: US 9,998,233 B2
(45) Date of Patent: Jun. 12, 2018

(54) OPTICAL RECEPTION APPARATUS

(71) Applicant: FUJITSU LIMITED, Kawasaki-shi, Kanagawa (JP)

(72) Inventors: Ryou Okabe, Shinagawa (JP); Masato Nishihara, Kawasaki (JP); Toshiki Tanaka, Setagaya (JP); Yutaka Kai, Kawasaki (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/992,272

(22) Filed: Jan. 11, 2016

(65) Prior Publication Data

US 2016/0218812 A1 Jul. 28, 2016

(30) Foreign Application Priority Data

Jan. 23, 2015 (JP) ................................ 2015-010912

(51) Int. Cl.
*H04B 10/00* (2013.01)
*H04B 10/60* (2013.01)
(Continued)

(52) U.S. Cl.
CPC ......... *H04B 10/60* (2013.01); *H04B 10/0775* (2013.01); *H04B 10/25133* (2013.01); *H04B 10/67* (2013.01); *H04B 2210/252* (2013.01)

(58) Field of Classification Search
CPC ................ H04B 10/60; H04B 10/0775; H04B 10/25133; H04B 10/67; H04B 2210/252
(Continued)

(56) References Cited

U.S. PATENT DOCUMENTS 4,433,693 A * 2/1984 Hochstein ............ A61B 5/0002
600/534
8,971,702 B2 * 3/2015 Le Taillandier De Gabory ........
G01M 11/338
398/29
(Continued)

FOREIGN PATENT DOCUMENTS

JP 2004-236097 8/2004
JP 2009-164728 7/2009

OTHER PUBLICATIONS

F. Devaux et al., "Simple Measurement of Fiber Dispersion and of Chirp Parameter of Intensity Modulated Light Emitter", Journal of Lightwave Technology, vol. 11, No. 12, Dec. 1993, pp. 1937-1940.

*Primary Examiner* — Amritbir Sandhu
(74) *Attorney, Agent, or Firm* — Fujitsu Patent Center

(57) ABSTRACT

An optical reception apparatus may include a receiver, a monitor, and a controller. The optical reception apparatus receives multi-carrier modulated signal light modulated by a multi-carrier modulation scheme. The multi-carrier modulation scheme is available to allocate different transmission conditions for each of a plurality of subcarriers in accordance with transmission characteristics of the subcarriers. The receiver may receive from an optical transmission line a training signal light allocated with the same transmission conditions for each of the subcarriers. The monitor may monitor the transmission characteristics of the training signal light to detect a frequency at which a dip of the transmission characteristics occurs. The controller may control, based on the frequency detected by the monitor, a dispersion compensation for the multi-carrier modulated signal light having received a dispersion from the optical transmission line.

7 Claims, 23 Drawing Sheets

(51) Int. Cl.
*H04B 10/077* (2013.01)
*H04B 10/2513* (2013.01)
*H04B 10/67* (2013.01)

(58) Field of Classification Search
USPC ....... 398/147, 158, 159, 182, 192, 195, 202, 398/208
See application file for complete search history.

(56) References Cited

U.S. PATENT DOCUMENTS

| | | | | |
|---|---|---|---|---|
| 9,749,055 | B2 * | 8/2017 | Tanaka | H04B 10/516 |
| 2002/0159691 | A1 * | 10/2002 | Zenteno | G02B 6/29349 |
| | | | | 385/27 |
| 2003/0025957 | A1 * | 2/2003 | Jayakumar | H04B 10/00 |
| | | | | 398/5 |
| 2003/0123775 | A1 * | 7/2003 | Miyata | G02F 1/116 |
| | | | | 385/7 |
| 2004/0184813 | A1 | 9/2004 | Mikami | |
| 2005/0146710 | A1 * | 7/2005 | Zaacks | G01M 11/333 |
| | | | | 356/73 |
| 2005/0271387 | A1 * | 12/2005 | Kee | H04B 10/2543 |
| | | | | 398/140 |
| 2010/0284695 | A1 * | 11/2010 | Lin | H04B 10/2513 |
| | | | | 398/81 |
| 2011/0002689 | A1 * | 1/2011 | Sano | H04B 10/69 |
| | | | | 398/44 |
| 2012/0230673 | A1 * | 9/2012 | Striegler | H04B 10/07951 |
| | | | | 398/16 |
| 2012/0281981 | A1 * | 11/2012 | Le Taillandier De Gabory | ........ |
| | | | | G01M 11/338 |
| | | | | 398/29 |
| 2013/0051804 | A1 * | 2/2013 | Chung | H04B 10/5563 |
| | | | | 398/79 |
| 2013/0209098 | A1 * | 8/2013 | Huang | H04B 10/60 |
| | | | | 398/43 |
| 2013/0315267 | A1 * | 11/2013 | Sasaki | H04B 10/5563 |
| | | | | 370/536 |
| 2014/0064732 | A1 * | 3/2014 | Kai | H04B 10/6161 |
| | | | | 398/76 |
| 2014/0099115 | A1 * | 4/2014 | Tanaka | H04J 14/028 |
| | | | | 398/76 |
| 2014/0099116 | A1 * | 4/2014 | Bai | H04B 10/532 |
| | | | | 398/76 |
| 2016/0112139 | A1 * | 4/2016 | Tanaka | H03F 1/32 |
| | | | | 398/43 |
| 2016/0204869 | A1 * | 7/2016 | Nishihara | H04B 10/516 |
| | | | | 398/43 |
| 2016/0218812 | A1 * | 7/2016 | Okabe | H04B 10/60 |
| 2016/0248500 | A1 * | 8/2016 | Okabe | H04L 27/2647 |
| 2016/0285548 | A1 * | 9/2016 | Nishihara | H04B 10/50 |
| 2016/0323984 | A1 * | 11/2016 | Okuda | H05B 41/2888 |
| 2016/0352609 | A1 * | 12/2016 | Nishihara | H04L 1/20 |
| 2017/0033870 | A1 * | 2/2017 | Dangui | H04B 10/43 |
| 2017/0070286 | A1 * | 3/2017 | Nishihara | H04B 10/07957 |
| 2017/0078027 | A1 * | 3/2017 | Okabe | H04B 10/58 |

* cited by examiner

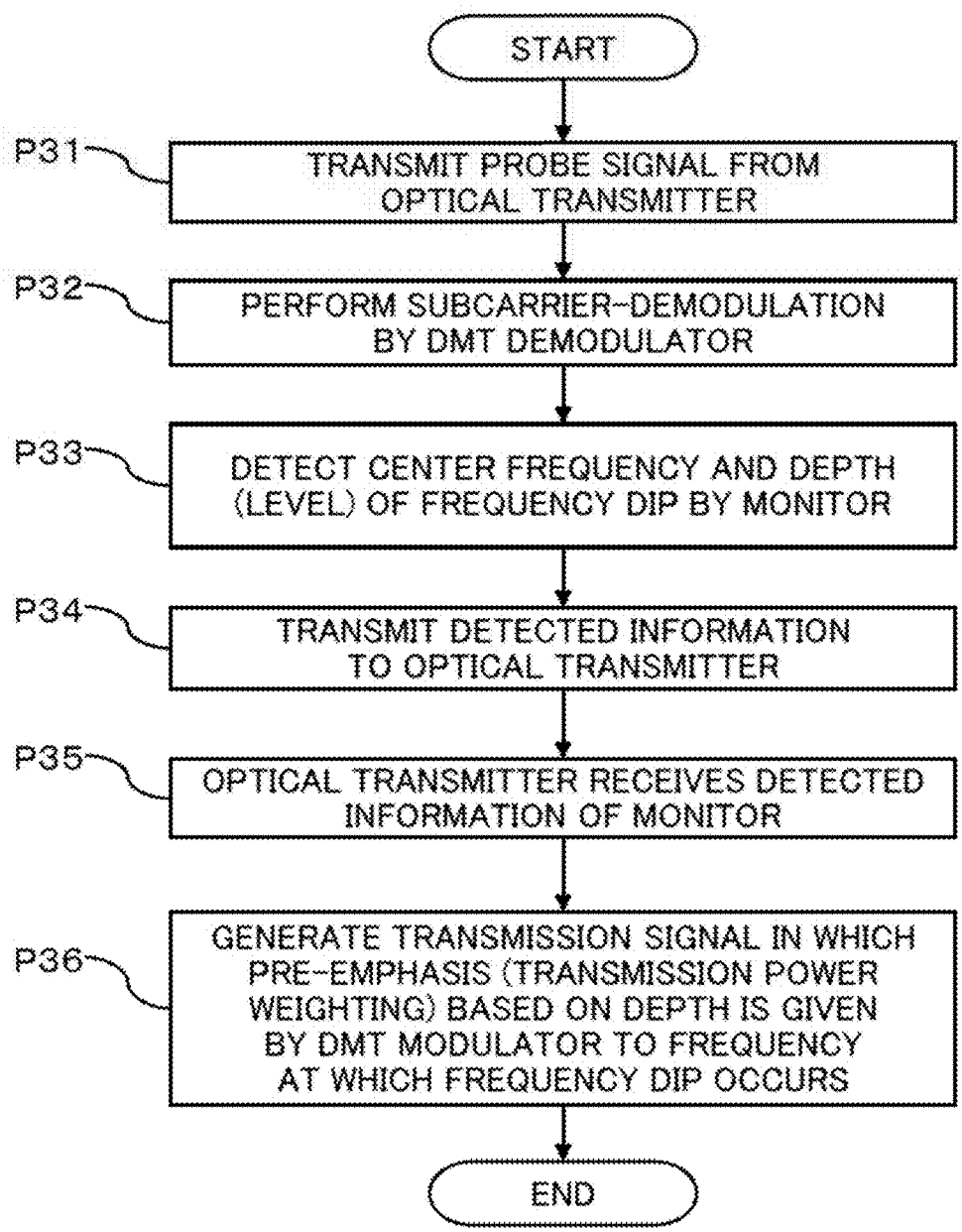

OPTICAL RECEPTION APPARATUS

CROSS-REFERENCE TO RELATED APPLICATION

This application is based upon and claims the benefit of priority of the prior Japanese Patent application No. 2015-010912, filed on Jan. 23, 2015, the entire contents of which are incorporated herein by reference.

FIELD

The embodiments discussed herein are related to an optical reception apparatus, an optical transmission apparatus, a multi-carrier optical transmission system, and a method for controlling a dispersion compensation.

BACKGROUND

In recent years, with increasing transmission traffic, demands for an improvement in transmission capacity of an optical transmission system are growing. In addition, for a short-distance transmission system, there are demands for not only an improvement in transmission capacity but also low-cost and simple configurations.

Thus, an optical transmission system applied a discrete multi-tone (DMT) modulation scheme (or format) is under consideration. The DMT modulation scheme is one example of a multi-carrier transmission technology based on an orthogonal frequency division multiplexing (OFDM) technology. For example, the DMT modulation scheme is used in the DSL technology such as an asymmetric digital subscriber Line (ADSL).

The DMT modulation scheme (may also be referred to as a "multi-carrier modulation scheme") uses a technique called a "bit loading". The "bit loading" allocates bits to each of subcarriers dependent on transmission characteristics of the subcarriers. The "transmission characteristics" may also be referred to as "reception characteristics" or "signal quality" or "transmission conditions".

Exemplary indicators or indices of the transmission characteristics may include a signal-to-noise ratio (SNR) and a bit error rate (BER). The DMT scheme allocates to a subcarrier with high transmission characteristics bits more than that of a subcarrier with low transmission characteristics. Therefore, it is possible to improve a usage efficiency of frequency in a transmission band and to increase a transmission capacity.

In a case where the DMT modulation scheme is applied to an optical transmission system, an electro-optic (E/O) converter with a direct modulation scheme by using a semiconductor laser can be applied to an optical transmitter. Meanwhile, an optic-electro (O/E) converter with a light reception element such as a photo detector or photo diode (PD) can be applied to an optical receiver.

The semiconductor laser and the PD are general optical devices and so are inexpensive. Further, in the direct modulation scheme, a modulated signal is generated by modulating a driving current of the semiconductor laser that is a light source in accordance with transmission data. Upon comparing with an external modulation scheme using an optical modulator in addition to a light source, the direct modulation scheme may be difficult to enhance a modulation speed. However, since the direct modulation scheme is unnecessary to use phase information of a signal light, it is possible to decrease in sizes and costs of an optical transmission system.

Therefore, by applying the DMT modulation scheme to an optical transmission system, it is possible to provide an optical transmission system which is available to improve the frequency usage efficiency (in other words, transmission capacity) and to decrease in sizes and costs.

Patent Document(s) List

Patent Document 1: JP 2009-164728 A
Patent Document 2: JP 2004-236097 A

Non-Patent Document(s) List

Non-Patent Document 1: F. Devaux et al., "Simple Measurement of Fiber Dispersion and of Chirp Parameter of Intensity Modulated Light Emitter", JOURNAL OF LIGHTWAVE TECHNOLOGY, VOL 11, No. 12, December 1993, pp. 1937-40

In the DMT modulation scheme, the frequency usage efficiency in a transmission band and transmission capacities can be increased by using the "bit loading". However, a dip of transmission characteristics may occurs at some frequencies in the transmission band. A frequency or a frequency range where the dip of transmission characteristics occurs may be referred to as a "frequency dip".

The "frequency dip" may be caused by, for example, a frequency chirping added to transmission signal light due to frequency characteristics of the light source in an optical transmitter and a dispersion added to the transmission signal light from an optical transmission line.

When the "frequency dip" occurs in the transmission band, the number of bits that can be allocated by using the "bit loading" to the subcarrier corresponding to the "frequency dip" may be limited. Therefore, transmission capacities in the transmission band may be limited.

SUMMARY

One aspect of an optical reception apparatus is available to receive multi-carrier modulated signal light which is modulated by a multi-carrier modulation scheme. The multi-carrier modulation scheme is available to allocate different transmission conditions for each of a plurality of subcarriers in accordance with the transmission characteristics of the subcarriers. The optical reception apparatus may include a receiver, a monitor, and a controller. The receiver may be configured to receive from an optical transmission line a training signal light allocated with the same transmission conditions for each of the subcarriers. The monitor may be configured to monitor the transmission characteristics of the training signal light to detect a frequency at which a dip of the transmission characteristics occurs. The controller may be configured to control, based on the detected frequency, a dispersion compensation for the multi-carrier modulated signal light having received a dispersion from the optical transmission line.

In addition, one aspect of an optical transmission apparatus may include a transmitter, a tunable dispersion compensator, and a controller. The transmitter may be configured to transmit to an optical transmission line a multi-carrier modulated signal light modulated by a multi-carrier modulation scheme. The multi-carrier modulation scheme is available to allocate different transmission conditions for each of a plurality of subcarriers in accordance with transmission characteristics of the subcarriers. The tunable dispersion compensator may be configured to compensate for a dispersion of the multi-carrier modulated signal light by a tunable dispersion compensation quantity. The controller may be configured to control a dispersion compensation for the multi-carrier modulated signal light which receives a dispersion from the optical transmission line based on a detection result received from an optical reception apparatus. The detection result may be detected in the optical reception apparatus and may be indicative of a frequency at which a dip of transmission characteristics of a training signal light occurs. The training signal may be allocated with the same transmission conditions for each of the subcarriers and being transmitted to the optical transmission line by the transmitter.

Furthermore, one aspect of a multi-carrier optical transmission system may include an optical transmission apparatus, an optical reception apparatus, a tunable dispersion compensator, a monitor, and a controller. The optical transmission apparatus may be configured to transmit to an optical transmission line a multi-carrier modulated signal light modulated by a multi-carrier modulation scheme. The multi-carrier modulation scheme is available to allocate different transmission conditions for each of a plurality of subcarriers in accordance with transmission characteristics of the subcarriers. The optical reception apparatus may be configured to receive the multi-carrier modulated signal light from the optical transmission line. The tunable dispersion compensator may be provided in the optical reception apparatus or the optical transmission apparatus and the tunable dispersion compensator may be configured to compensate for dispersion of the optical transmission line with a tunable dispersion compensation quantity. The monitor may be provided in the optical reception apparatus and configured to monitor transmission characteristics of a training signal light transmitted to the optical transmission line by the optical transmission apparatus to detect a frequency at which a dip of the transmission characteristics occurs. The training signal may be allocated with the same transmission conditions for each of the subcarriers. The controller may be configured to control a dispersion compensation quantity of the tunable dispersion compensator based on the detected frequency.

In addition, as an aspect of the invention, a method of controlling a dispersion compensation may transmit a training signal light allocated with the same transmission conditions for each of a plurality of subcarriers to an optical transmission line by an optical transmission apparatus of a multi-carrier modulation scheme. The multi-carrier modulation scheme is available to allocate different transmission conditions for each of the subcarriers in accordance with transmission characteristics of the subcarriers. The method may detect a frequency at which a dip of transmission characteristics occurs by monitoring the transmission characteristics of the training signal light in an optical reception apparatus. The method may control, based on the detected frequency, a dispersion compensation for a multi-carrier modulated signal light which receives a dispersion from the optical transmission line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 23 is a flow chart illustrating an exemplary operation for a pre-emphasis of the multi-carrier optical transmission system illustrated in FIG. 21.

DESCRIPTION OF EMBODIMENTS

Figure 1:
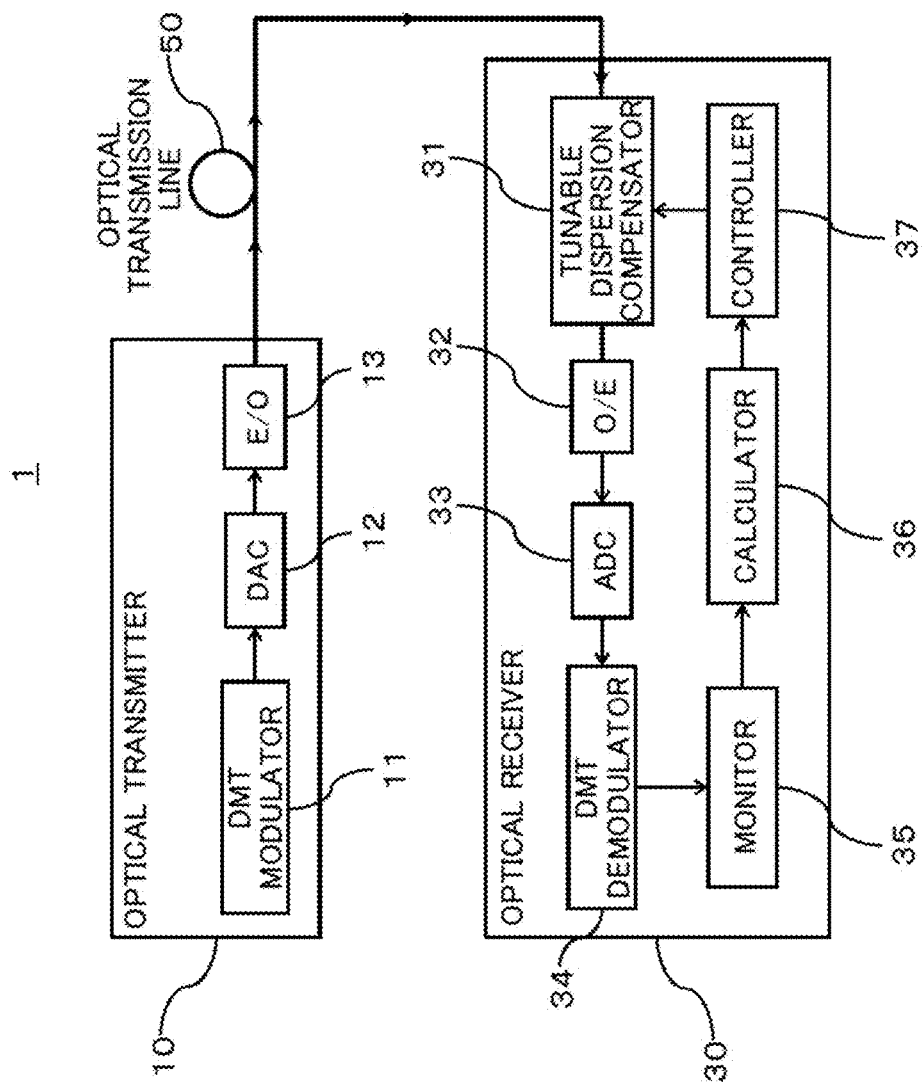
FIG. 1 is a block diagram illustrating an exemplary configuration of a multi-carrier optical transmission system applied with a DMT modulation scheme according to a first embodiment.

Hereinafter, embodiments will be described with reference to the drawings. The embodiments described below are merely examples and do not intend to exclude an application of various modifications and technologies not described below. Also, various exemplary aspects described below may appropriately be combined for an implementation. In the drawings used in the following embodiments, portions to which the same reference numeral are attached represent the same or similar portions unless otherwise mentioned.

(First Embodiment)

FIG. 1 is a block diagram illustrating an exemplary configuration of a multi-carrier optical transmission system applied with the DMT modulation scheme according to a first embodiment. The multi-carrier optical transmission system 1 depicted in FIG. 1 may illustratively include an optical transmission apparatus 10 and an optical reception apparatus 30 connected to the optical transmission apparatus 10 via an optical transmission line 50 using an optical transmission medium such as an optical fiber. One or more of optical amplifiers may be provided to the optical transmission line 50. The optical transmission apparatus 10 may also be referred to as the "optical transmitter 10", and the optical reception apparatus 30 may also be referred to as the "optical receiver 30".

The optical transmitter 10 modulates transmission data with the DMT modulation scheme and the direct modulation scheme, and transmits the obtained transmission modulated signal light to the optical transmission line 50. The DMT modulation scheme is an example of the multi-carrier modulation scheme. The transmission modulated signal light may also be referred to as "DMT modulated signal light". The DMT modulated signal light is an example of multi-carrier modulated signal light.

The optical receiver 30 converts DMT modulated signal light received from the optical transmission line 50 into an electric signal to obtain reception data by performing a DMT demodulation on the electric signal.

(Optical Transmission Apparatus)

The optical transmitter 10 may illustratively include a DMT modulator 11, a digital-analog converter (DAC) 12, and an electro-optic (E/O) module 13.

The DMT modulator 11 is an example of a multi-carrier modulator and generates a DMT modulated signal by performing DMT modulation on transmission data of an electric signal. A block which includes the DMT modulator 11 or includes the DMT modulator 11, the DAC 12, and the E/O module 13 may be considered as an example of a transmitter.

Figure 2:
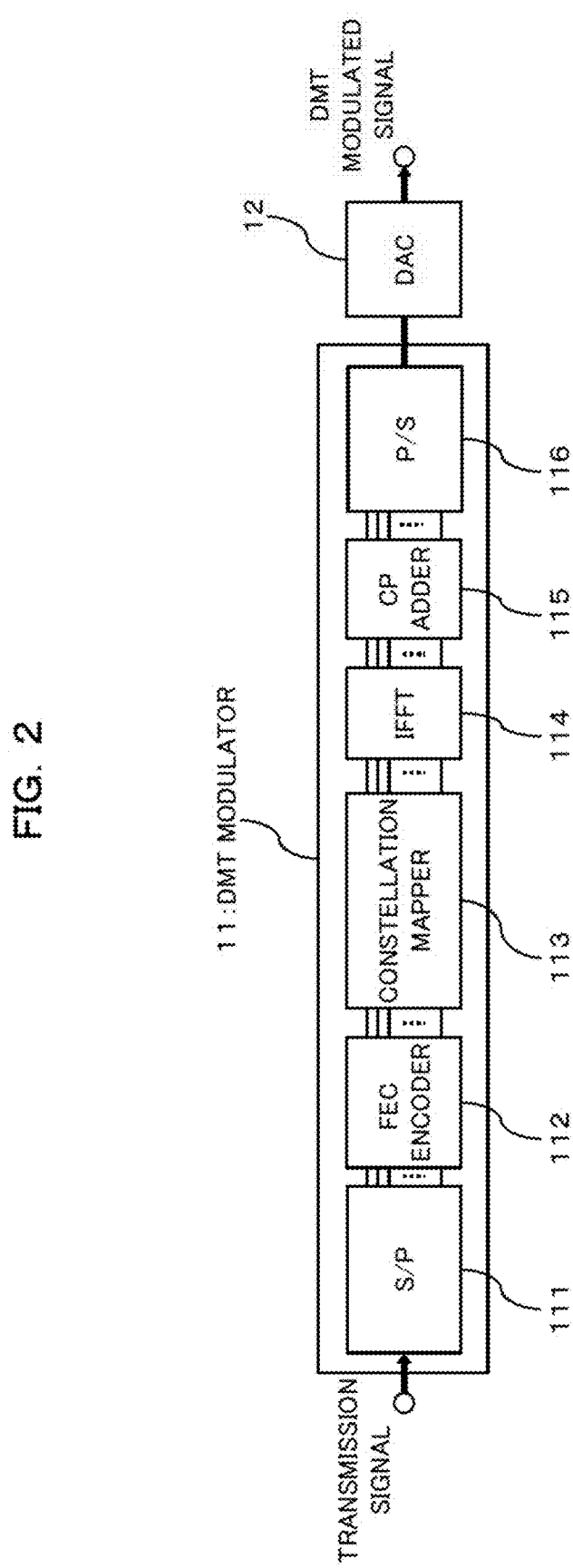
FIG. 2 is a block diagram illustrating an exemplary configuration of a DMT modulator in an optical transmission apparatus illustrated in FIG. 1.

As illustrated in FIG. 2, the DMT modulator 11 may include a serial-to-parallel (S/P) converter 111, an FEC encoder 112, a constellation mapper 113, an IFFT 114, a CP adder 115, and a parallel-to-serial (P/S) converter 116.

The "FEC" is an abbreviation of the "Forward Error Correction", the "IFFT" is an abbreviation of the "Inverse Fast Fourier Transformer", and the "CP" is an abbreviation of the "Cyclic Prefix". The CP may also be referred to as a guard interval (GI).

The S/P converter 111 performs an S/P-conversion on a transmission signal (which may also be referred to as "transmission data") to generate parallel data, the number of which depending on the number of transmission subcarriers. The generated parallel data are input to the FEC encoder 112.

The FEC encoder 112 is an example of an error-correction coder and performs an error-correction-coding on the parallel data input from the S/P converter 111. A Low-density parity-check code (LDPC) or a turbo code is applicable to the error-correction code, for example. The coded parallel data are input to the constellation mapper 113.

The constellation mapper 113 maps parallel data (may be digital bit streams) input from the FEC encoder 112 to a symbol in a complex plane (in other words, IQ plane) which may be referred to as a "constellation" for each subcarrier.

Figure 3:
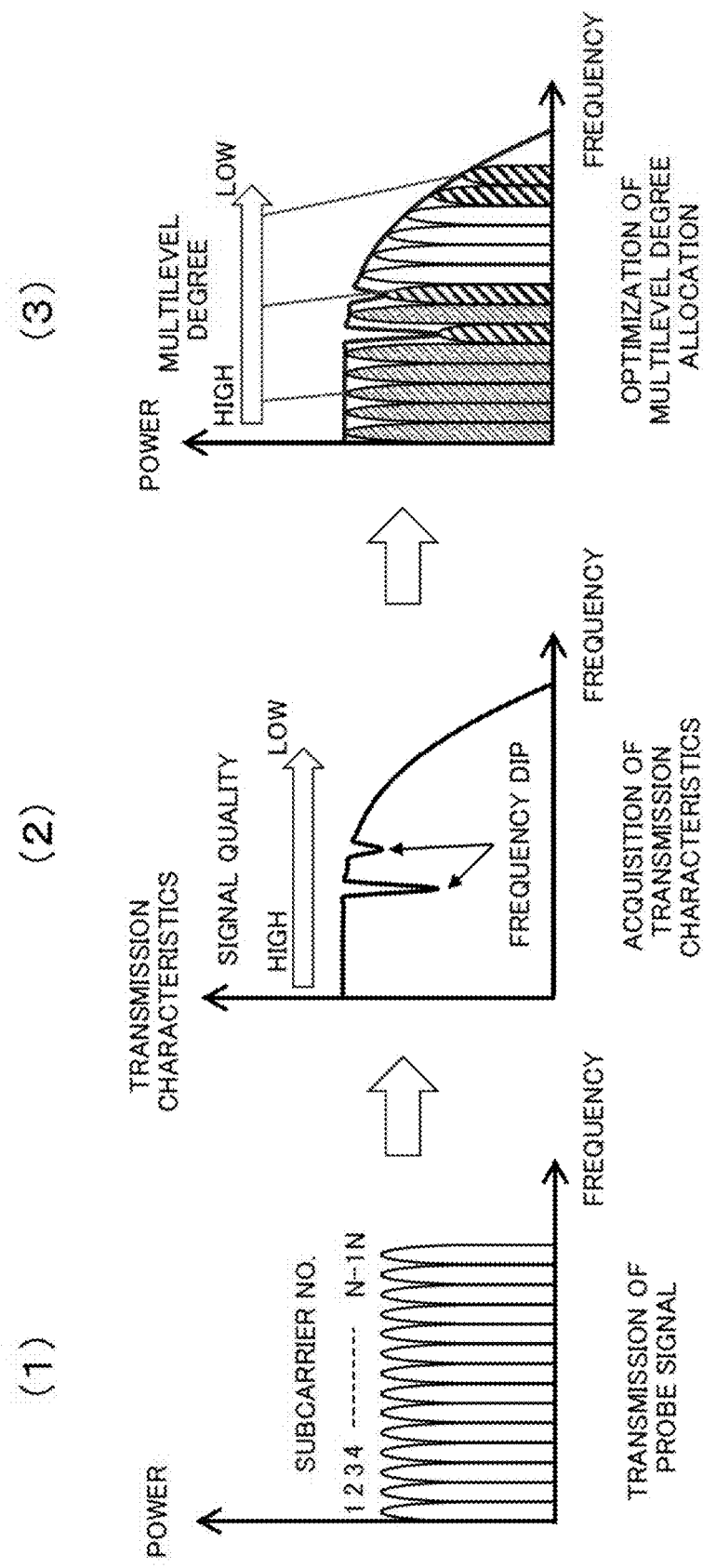
FIG. 3 is a schematic diagram conceptually illustrating a multi-carrier modulation by the DMT modulator illustrated in FIGS. 1 and 2.

The mapping may also be referred to as a "subcarrier modulation". An example of a subcarrier arrangement is depicted in a region (1) of FIG. 3. The region (1) of FIG. 3 illustrates a state where N (N is an integer equal to 2 or greater) subcarriers are set in the frequency domain. "1" to "N" indicate the subcarrier number. In the example in the region (1) of FIG. 3, as the subcarrier number increases, the frequency of the subcarrier is higher. However, the allocation of the subcarrier number to the frequency may be changed appropriately.

The DMT modulation scheme is available to allocate more bits per symbol to a subcarrier with higher transmission characteristics (may also be referred to as "reception characteristics" or "signal quality").

For example, as illustrated in a region (2) of FIG. 3, it is assumed a case where transmission characteristics become higher or lower depending on the frequency. In this case, the constellation mapper 113 may allocate, as illustrated in a region (3) of FIG. 3, more bits per symbol to a subcarrier with a subcarrier number having higher transmission characteristics than to a subcarrier with a subcarrier number having lower transmission characteristics.

The number of bits allocated to a symbol may be considered to correspond to a multi-level degree. For example, when the QPSK (Quadrature Phase Shift Keying) is applied to the subcarrier modulation, the multi-level degree is 4. When the M-QAM (Quadrature Amplitude Modulation) is applied to the subcarrier modulation, the multi-level degree is M (=16, 64, 256 . . . ).

Returning to FIG. 2, the IFFT 114 performs an inverse fast Fourier transform (IFFT) processing on a signal in the frequency domain mapped to a symbol for each subcarrier by the constellation mapper 113 to convert the signal into a signal in the time domain.

The CP adder 115 adds a CP to a signal (e.g., symbol data) converted into the time domain by the IFFT 114. The addition of CP may be performed by copying data of a predetermined length from the end of the symbol data after the IFFT processing and adding the copied data to the head of the relevant symbol. With the addition of CP, it is possible to remove or reduce an inter-symbol interference.

The P/S converter 116 performs a P/S conversion on the symbol data added the CP by the CP adder to generate a DMT modulated signal. The DMT modulated signal is input to the DAC 12.

The DMT modulator 11 which includes the S/P converter 111, the FEC encoder 112, the constellation mapper 113, the IFFT 114, the CP adder 115, and the P/S converter 116 may be achieved by a DSP or an FPGA. The "DSP" is an abbreviation of "Digital Signal Processor" and the "FPGA" is an abbreviation of "Field-Programmable Gate Array".

Returning to FIG. 1, the DAC 12 converts the DMT modulated signal that is a digital signal generated as described above into an analog signal and inputs the analog signal to the E/O module 13.

The E/O module 13 converts the DMT modulated signal input from the DAC 12 to a signal light. For example, the E/O module 13 may include a light source and a driver, which are not illustrated. A block which includes the light source and the driver may be referred to as a "transmitter optical sub-assembly (TOSA)".

The driver provides a drive signal in accordance with the DMT modulated signal that is an analog signal to the light source. Drive conditions (for example, a bias current and its amplitude) of the light source are controlled in accordance with the drive signal. Light-emitting power of the light source varies in accordance with the control and thereby a DMT modulated signal light is generated.

In other words, the E/O module 13 performs the direct modulation (DM) on output light of the light source with the DMT modulated signal. The light source may be a semiconductor laser, for example. Since the semiconductor laser is directly driven for the modulation with the DMT modulated signal, it may be referred to as a "direct modulation laser, DML". Since the driver drives the DML, it may be referred to as a "DML driver".

The DMT modulated signal light generated as described above by the E/O module 13 is transmitted to the optical transmission line 50.

(Optical Reception Apparatus)

Next, the optical receiver 30 illustrated in FIG. 1 will be described. The optical receiver 30 may illustratively include a tunable dispersion compensator 31, an optic-electro (O/E) module 32, an analog-to-digital converter (ADC) 33, a DMT demodulator 34, a monitor 35, a calculator 36, and a controller 37.

The tunable dispersion compensator 31 may be an optical dispersion compensator which compensates for a dispersion of the DMT modulated signal light received from the optical transmission line 50 with a tunable (or variable) quantity in dispersion compensation. The quantity of dispersion compensation may be controlled by the controller 37. A compensator using a chirped fiber Bragg grating, a chirped diffraction grating, an etalon, or a VIPA (Virtually Imaged Phased Array) and the like may be used for the tunable dispersion compensator 31.

In the received DMT modulated signal light, as illustrated in, for example, a region (2) of FIG. 3, a "dip of transmission characteristics" may occur in the frequency domain. The "dip of transmission characteristics" in the frequency domain may also be referred to as a "frequency dip".

The "frequency dip" may illustratively be caused by a frequency chirp parameter ($\alpha$) added to transmission signal light due to frequency characteristics of the light source in the optical transmitter 10 and a dispersion given to a DMT modulated signal by the optical transmission line 50. Details thereof will be described below. The frequency chirp parameter ($\alpha$) may be abbreviated as a "chirp parameter ($\alpha$)" below.

As will be described below, the controller 37 may control the dispersion compensation performed by the tunable dispersion compensator 31 such that the frequency dip monitored by the monitor 35 deviates from the transmission band of the DMT modulated signal light. The "monitor" may also be referred to as a "detection" or a "measurement". The "transmission band of DMT modulated signal light" may be abbreviated as a "DMT transmission band" for the purpose of illustration.

By deviating the frequency dip from the DMT transmission band, it is possible to increase the number of subcarriers available to be allocated more bits for each symbol by using a modulation scheme with a high multi-level degree in the DMT transmission band.

Therefore, it is possible to increase transmission capacities of the multi-carrier optical transmission system 1. In other words, it is possible to eliminate or mitigate the limitation of transmission capacities caused by an occurrence of the frequency dip in the DMT transmission band.

The O/E module 32 converts the received DMT modulated signal light dispersion-compensated by the tunable dispersion compensator 31 into an electric signal. Thus, the O/E module 32 may illustratively include a PD (a photo detector or a photo diode) as an example of the light reception element.

The PD converts the received DMT modulated signal light into an electric signal (for example, a current signal) having an amplitude corresponding to the received optical power. The current signal corresponding to the received optical power of the PD may be converted into a voltage signal by using a trans-impedance amplifier (TIA), for example. A block which includes the PD and the TIA may be referred to as a "receiver optical sub-assembly (ROSA)".

The ADC 33 converts the analog signal obtained by the above photoelectric conversion performed by the O/E module 32 into a digital signal.

The DMT demodulator 34 performs a DMT-demodulation on the analog electric signal input from the ADC 33 to obtain received data. A block which includes the DMT demodulator 34 or includes the O/E module 32, the ADC 33, and the DMT demodulator 34 may be considered as corresponding to an example of a receiver.

Figure 4:
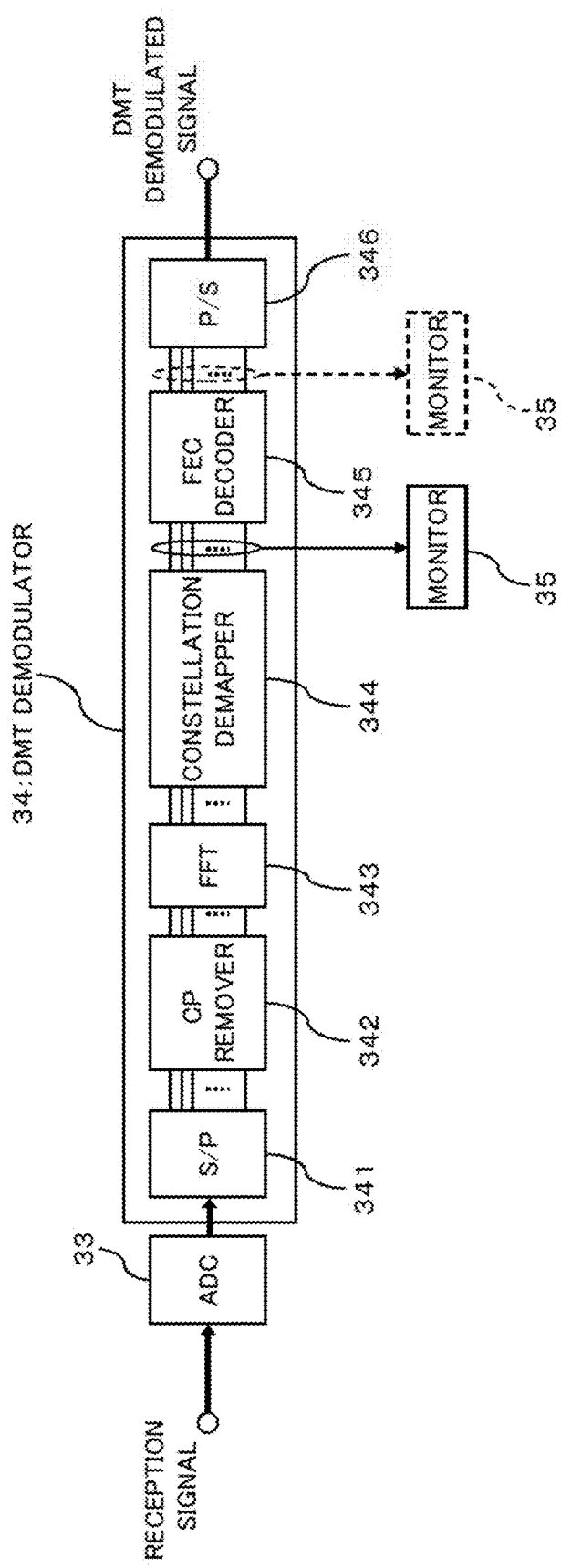
FIG. 4 is a block diagram illustrating an exemplary configuration of a DMT demodulator in an optical reception apparatus illustrated in FIG. 1.

The DMT demodulator 34 may include, as illustrated in FIG. 4, an S/P converter 341, a CP remover 342, an FFT 343, a constellation de-mapper 344, an FEC decoder 345, and a P/S converter 346, for example. The "FFT" is an abbreviation of "Fast Fourier Transformer".

The S/P converter 341 performs a serial-to-parallel conversion on an electric signal input from the ADC 33 to obtain parallel signals, the number of which depending on the number of subcarriers. The parallel signals obtained by the serial-to-parallel conversion are input to the CP remover 342.

The CP remover 342 removes the CP added to the DMT modulated signal by the CP adder 115 (see FIG. 2) in the optical transmitter 10 from the input parallel signals. The parallel signals from which the CP is removed (in other words, the received DMT modulated signal) is input to the FFT 343.

The FFT 343 performs FFT (Fast Fourier Transform) processing on the received DMT modulated signal from which the CP is removed to convert it into a signal in the frequency domain. The FFT-processed received DMT modulated signal is input to the constellation de-mapper 344.

The constellation de-mapper 344 discriminates (or identifies) received symbol in the "constellation" for each subcarrier from the signal in the frequency domain obtained by the FFT 343 to extract (or de-map) bits mapped to the received symbol. Accordingly, the received DMT modulated signal is demodulated. The demodulation may also be referred to as a "subcarrier demodulation" or a "DMT demodulation". The subcarrier-demodulated signal for each subcarrier (may also be referred to as a "subcarrier signal") is input to the FEC decoder 345.

The FEC decoder 345 is an example of an error-correction decoder and performs an error-correction-decoding on a subcarrier signal obtained by the subcarrier demodulation performed by the constellation de-mapper 344. The scheme of error-correction-decoding may be a scheme corresponding to the scheme of error-correction-coding applied to the FEC encoder 112 (see FIG. 2) in the optical transmitter 10.

The P/S converter 346 performs a P/S-conversion on the subcarrier signals decoded with an error-correction-decoding by the EEC decoder 345. Accordingly, a received signal of the demodulated and decoded serial signal is obtained.

Similar to the DMT modulator 11, the DMT demodulator 34 which includes the S/P converter 341, the CP remover 342, the FFT 343, the constellation de-mapper 344, the FEC decoder 345, and the P/S converter 346 may be achieved by a DSP or an FPGA.

The IFFT 114 (see FIG. 2) in the DMT modulator 11 and the FFT 343 (see FIG. 4) in the DMT demodulator 34 may be replaced by an IDFT and a DFT, respectively. The "DFT" is an abbreviation of "Discrete Fourier Transformer" and the "IDFT" is an abbreviation of "Inverse Discrete Fourier Transformer".

The monitor 35 illustrated in FIG. 1 may monitor (or measure), as depicted in FIG. 4, reception characteristics of the subcarrier signals input to the FEC decoder 345 from the constellation de-mapper 344 for each subcarrier. Examples of the reception characteristics may include one or both of a signal-to-noise ratio (SNR) and a bit error rate (BER). Based on the reception characteristics of each subcarrier, the monitor 35 is available to detect one or more of frequency dip (for example, center frequency thereof) in the DMT transmission band. Details such as a configuration example of the monitor 35 will be described below.

The "frequency dip" may be considered to be caused by the following reason. When a light reception (or detection) element such as a PD receives modulation components signal including an upper side band component and a lower side band component of an optical signal to convert the optical signal into an intensity signal corresponding to the reception power, each of the modulation components are canceled out and lost due to optical phases of the modulation components being in opposite phases.

The signal to be monitored by the monitor 35 may be, as indicated by a dotted line in FIG. 4, each subcarrier signal input to the P/S converter 346 from the FEC decoder 345. However, it is assumed that it takes some time for decode processing by the FEC decoder 345. Thus, it is possible to improve a control speed by monitoring each subcarrier signal input to the FEC decoder 345 rather than monitoring each subcarrier signal input to the P/S converter.

Next, the calculator 36 illustrated in FIG. 1 calculates, based on the center frequency of the frequency dip detected by the monitor 35, a dispersion compensation quantity sufficient to deviate the frequency dip from the DMT transmission band. An exemplary calculation of the dispersion compensation quantity will be described below.

The controller 37 controls (or sets) a dispersion compensation quantity of the tunable dispersion compensator 31 to the dispersion compensation quantity calculated by the calculator 36. Accordingly, as described above, it is possible to increase a transmission capacity in the DMT transmission band. For the optical receiver 30, since no frequency dip occurred in the DMT transmission band, it is possible to improve reception characteristics in the DMT transmission band.

The calculator 36 may be incorporated into the controller 37. In other words, the calculator 36 and the controller 37 may be integrated into a single control block or a single control circuit.

(Exemplary Calculation of the Dispersion Compensation Quantity)

Next, an exemplary calculation of the dispersion compensation quantity (in other words, target value) set to the tunable dispersion compensator 31 based on the frequency dip detected by the monitor 35 will be described. First, a frequency response $I_R$ of the DMT modulated signal light transmitted through the optical transmission line 50 can be represented by Formula 1 set out below.

$$I_R = m\sqrt{1+\alpha^2}\left|\cos\left(\frac{\pi\lambda^2 DLf^2}{c} + \tan^{-1}(\alpha)\right)\right| \quad \text{[Formula 1]}$$

In Formula 1, "m" represents a "degree of modulation", "α" represents a "chirp parameter" of the optical transmitter 10, and "λ" represents the "wavelength" of the DMT modulated signal light. Further, "D" represents a "dispersion", "L" represents the length of the optical transmission line 50 (may also be referred to as the "optical fiber length"), "f" represents the center frequency of the frequency dip, and "c" represents the "light speed".

Figure 5:
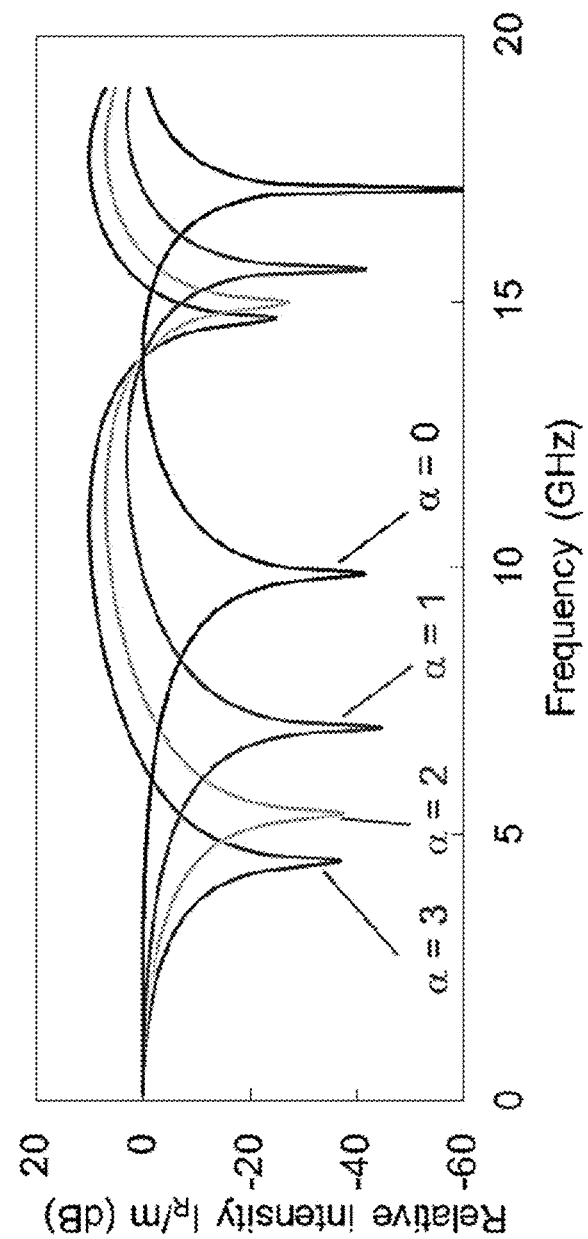
FIGS. 5 and 6 are diagrams illustrating an example of frequency response characteristics of a DMT modulated signal light.
Figure 6:
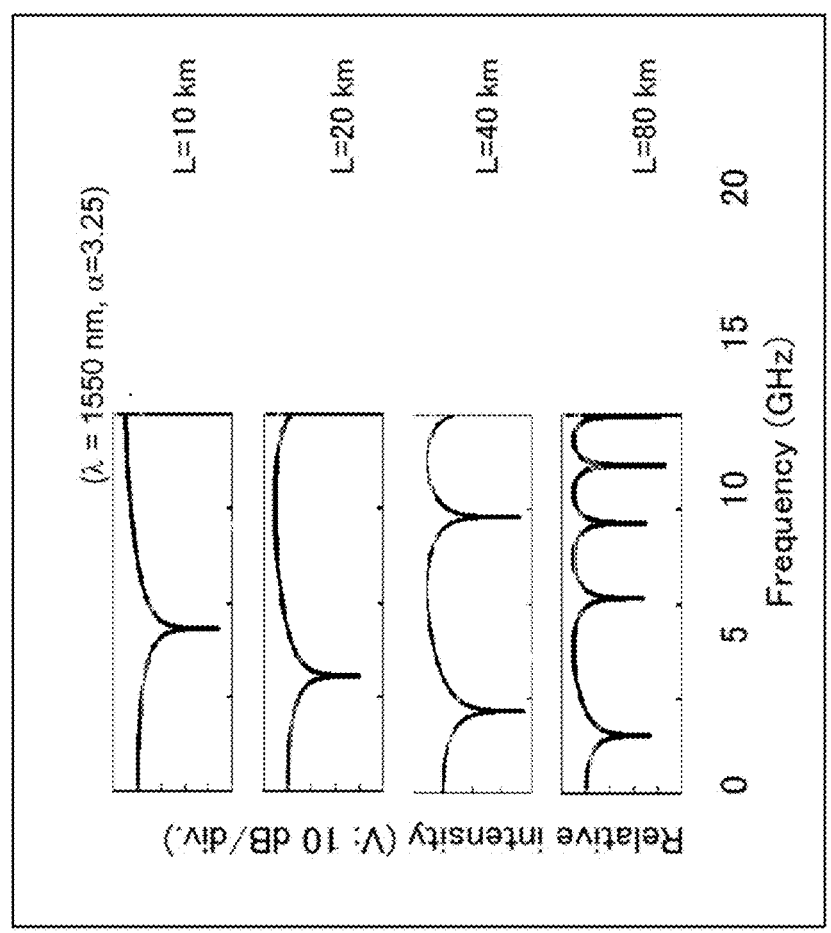

FIGS. 5 and 6 illustrates an example of frequency response characteristics (may also be referred to as "transmission characteristics") of the DMT modulated signal light represented by Formula 1. FIG. 5 illustrates frequency response characteristics for different chirp parameters α (α=0, α=1, α=2, α=3) when the dispersion D=16 [ps/nm/km], the optical fiber length L=40 [km], and the wavelength λ=1550 [nm].

As can be understood from FIG. 5, frequency response characteristics of the DMT modulated signal light change depending on the chirp parameter α of the optical transmitter 10. In other words, a frequency at which the frequency dip occurs changes depending on the chirp parameter α.

Meanwhile, FIG. 6 illustrates frequency response characteristics for different optical fiber lengths L [km] (L=10, L=20, L=40, L=80) when the dispersion D=16 [ps/nm/km], the wavelength λ=1550 [nm], and the chirp parameter α=3.25.

As can be understood from FIG. 6, the frequency response characteristics of the DMT modulated signal light also change depending on the optical fiber length L (in other words, the transmission distance of the DMT modulated signal light). For example, as illustrated in FIG. 6, the number of possible frequency dips occurred in the DMT transmission band tends to increase as the transmission distance becomes longer.

Figure 7:
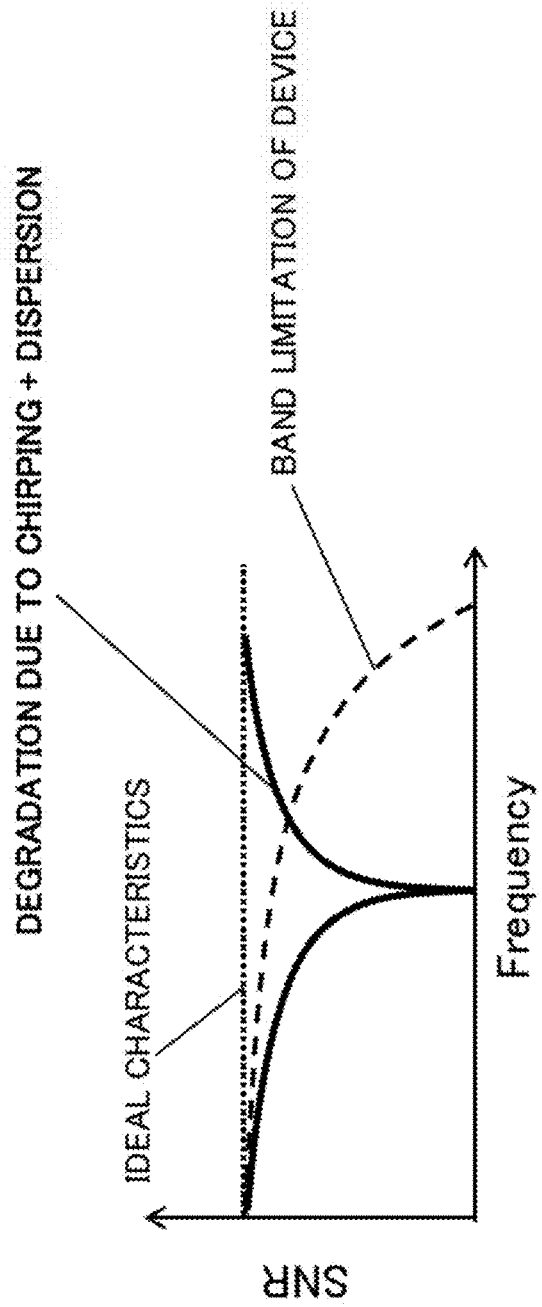
FIG. 7 is a diagram schematically illustrating a degraded state from ideal characteristics of transmission characteristics of the DMT modulated signal light.

In the DMT transmission band, as illustrated in FIG. 7, frequency response characteristics of the DMT modulated signal light are ideally flat. However, depending on frequency characteristics of optical devices used in the optical transmitter 10 and the optical receiver 30, for example, the DMT modulated signal light is easy to receive band limitations at the higher frequency, and thus, transmission characteristics of the DMT modulated signal light tend to deteriorate.

In addition to the band limitations, when the frequency dip occurs in the DMT transmission band due to the chirp parameter α of the optical transmitter 10 and the dispersion given to the DMT modulated signal by the optical transmission line 50, the transmission capacity in the DMT transmission band would be limited further.

For example, a symbol of a subcarrier corresponding to the frequency dip is not available to be allocated with transmission data bits. Even if available, the symbol would be allocated with just only a smaller number of transmission data bits than the number of transmission data bits when no frequency dip occurs (see FIG. 3).

Thus, the optical receiver 30, for example, detects the frequency dip and controls the dispersion compensation quantity of the received DMT modulated signal light in such a manner that the detected frequency dip is deviated from the DMT transmission band. Thereby, it is possible to eliminate or mitigate limitations to the transmission capacity.

Here, the degree of modulation m, the wavelength λ, and the light speed c in Formula 1 may be known values in the optical receiver 30. Therefore, when the chirp parameter α of the optical transmitter 10 is also a known value in the optical receiver 30, in response to a determination of the center frequency f of the frequency dip, a residual dispersion value (DL) represented by a product of the dispersion D and the optical fiber length L can be calculated by using Formula 2 set out below.

$$DL = \frac{c}{2f_u^2 \lambda^2}\left(1 + 2u - \frac{2}{\pi}\arctan(a)\right) \quad \text{[Formula 2]}$$

In Formula 2, "$f_u$" represents the center frequency of the u-th frequency dip (in other words, a resonance frequency at which the result of Formula 1 produces "0" for the u-th time) occurring in the DMT transmission band. The "f" can be considered as corresponding to one of "$f_1$ to $f_u$".

Figure 8:
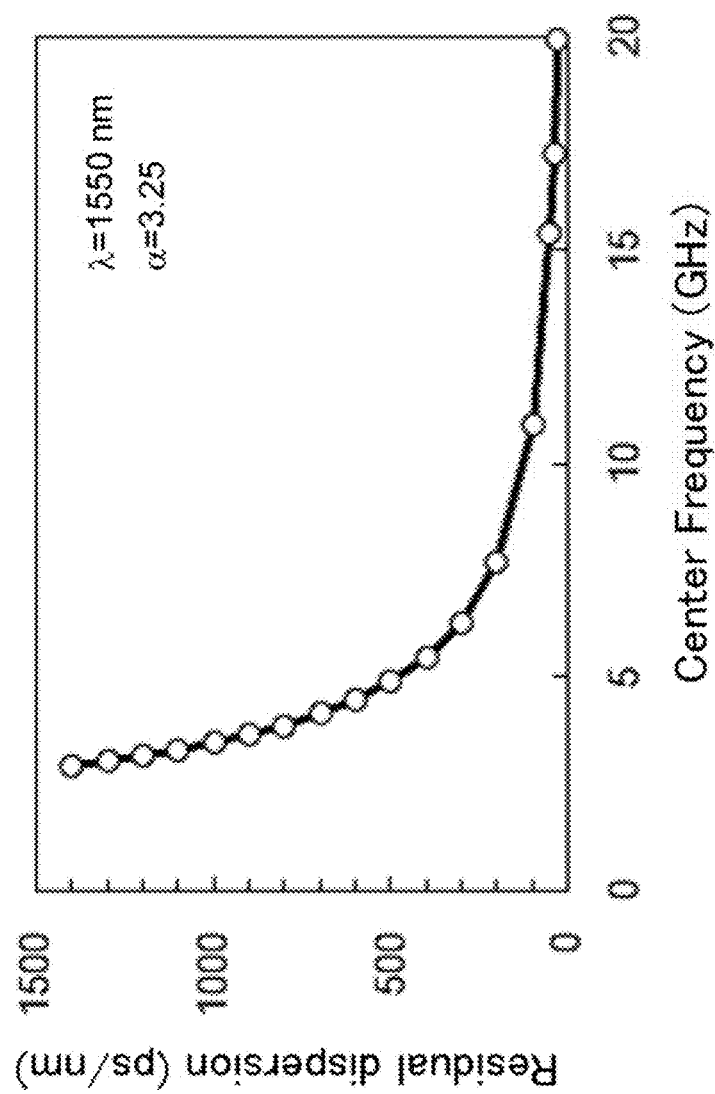
FIG. 8 is a diagram illustrating an example of changes in a residual dispersion value for the center frequency of a frequency dip occurred in the transmission band of the DMT modulated signal light.

Therefore, the calculator 36 illustrated in FIG. 1 is available to calculate the residual dispersion value by Formula 2 based on the center frequency f of the frequency dip detected by the monitor 35. The calculator 36 may include a memory (not illustrated) to store the known parameters in Formula 2. The calculator 36 can reliably determine the residual dispersion value with the calculation of Formula 2. The calculated residual dispersion value is provided to the controller 37. FIG. 8 illustrates an example of the relationship between the center frequency f [GHz] of the frequency dip and the residual dispersion value DL [ps/nm].

The controller 37 is available to determine, based on the residual dispersion value provided by the calculator 36, a target value of the dispersion compensation quantity sufficient to deviate the frequency dip from the DMT transmission band. The controller 37 controls the dispersion compensation quantity of the tunable dispersion compensator 31 to the target value.

In a case where the target value of the dispersion compensation quantity is not achieved by the single tunable dispersion compensator 31, an additional quantity for the target value may be achieved by an additional tunable dispersion compensator 31. In other words, the target value may be achieved by the multi-staged tunable dispersion compensators 31.

(Operation Example)

Figure 9:
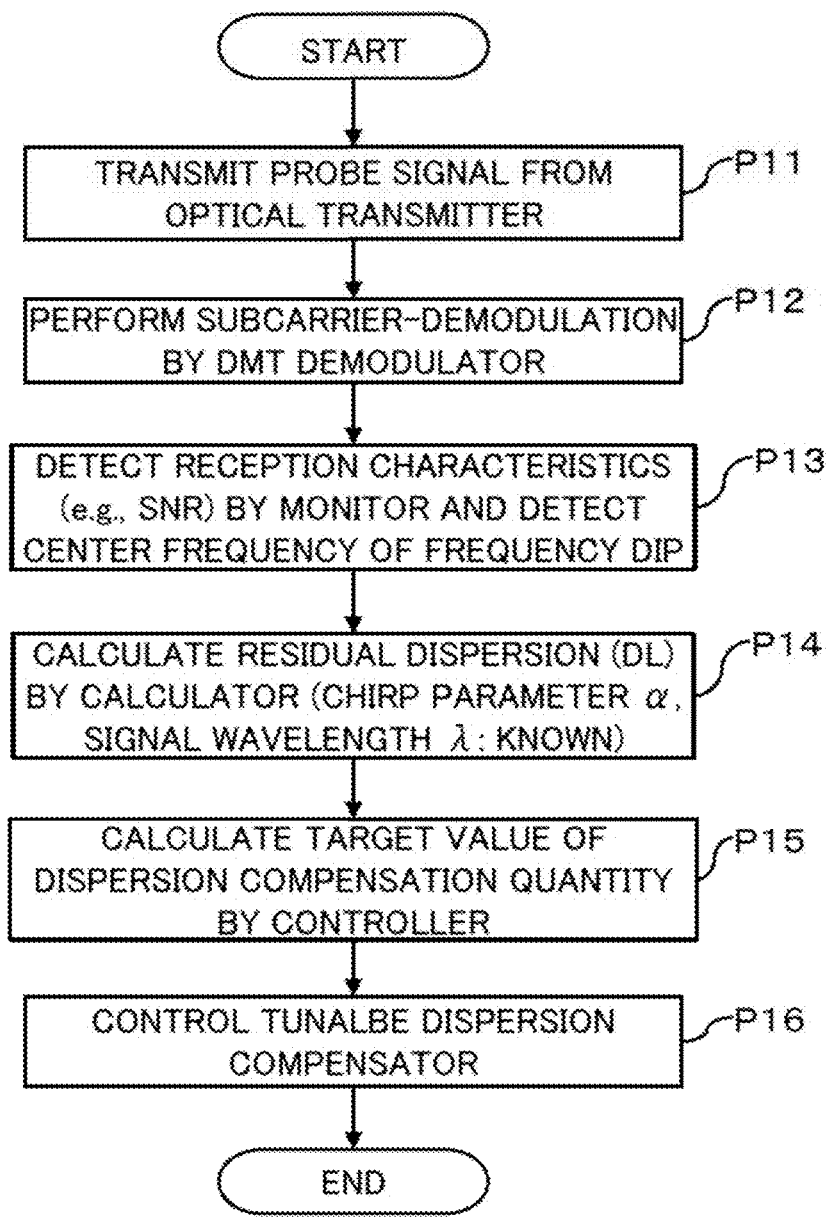
FIG. 9 is a flow chart illustrating an exemplary operation for a dispersion compensation control method of the multi-carrier optical transmission system illustrated in FIG. 1.

Next, an exemplary operation focusing on the frequency dip detection and dispersion compensation control in the multi-carrier optical transmission system 1 illustrated in FIG. 1 will be described with reference to the flow chart (processing P11 to P16) illustrated in FIG. 9.

First, a frequency dip can be detected by, for example, transmitting probe signal light from the optical transmitter 10 to the optical receiver 30. The "probe signal light" may be signal light in which the multi-level degree and the optical power level allocated to each subcarrier are equal (see, for example, the region (1) in FIG. 3).

Both of the "multi-level degree" and the "optical power level" allocated to each subcarrier are examples of "transmission conditions" available to be allocated to each subcarrier. Therefore, the "probe signal light" may be considered as signal light allocated with the same transmission conditions for each subcarrier. The "probe signal light" may also be referred to as "training signal light".

The optical transmitter 10 generates the probe signal whose multi-level degree and optical power level are equal for each subcarrier by the DMT modulator 11. The probe signal is converted into an analog signal by the DAC 12. A drive signal according to the analog signal is provided from the DML driver to the DML in the E/O module 13 to generate the probe signal light, and the generated probe signal is transmitted to the optical transmission line 50 (processing P11).

In the optical receiver 30, the probe signal light received from the optical transmission line 50 is converted into an electric signal by the O/E module 32, the electric signal is converted into a digital signal by the ADC 33, and the digital signal is demodulated with the subcarrier-demodulation by the DMT demodulator 34 (processing P12).

As illustrated in FIG. 4, each of the demodulated subcarrier signals is monitored by the monitor 35. The monitor 35 detects reception characteristics (for example, SNR) of each subcarrier signal, and detects the center frequency of a frequency dip based on the detection result (processing P13). Examples of the method of detecting the frequency dip by the monitor 35 will be described below.

Based on the center frequency of the frequency dip detected by the monitor 35, the calculator 36 calculates a residual dispersion value (DL) based on Formula 2 described above (processing P14).

Based on the calculated residual dispersion value, the controller 37 determines a target value of the dispersion compensation value sufficient to deviate the detected frequency dip from the DMT transmission band (processing P15). Then, the controller 37 controls the dispersion compensation value of the tunable dispersion compensator 31 to the determined target value (processing P16).

With the above processing, no frequency dip occurs in reception characteristics in the DMT transmission band of the optical receiver 30. Thus, when an actual transmission signal alternative to the probe signal is transmitted, the optical transmitter 10 (e.g., DMT modulator 11) is allowed to allocate more transmission bits to the subcarrier where the frequency dip was occurred in the DMT transmission band in comparison with a case where the frequency dip is not deviated from the DMT transmission band.

Therefore, it is possible to eliminate or mitigate limitations to the transmission capacity due to the occurrence of the frequency dip in the DMT transmission band. Thus, it is also possible to increase the transmission capacity of the DMT transmission band.

Next, some examples of the method of detecting the frequency dip by the monitor 35 will be described below with reference to FIGS. 10 to 15.

(Detection Example 1 of the Frequency Dip by the Monitor)

Figure 10:
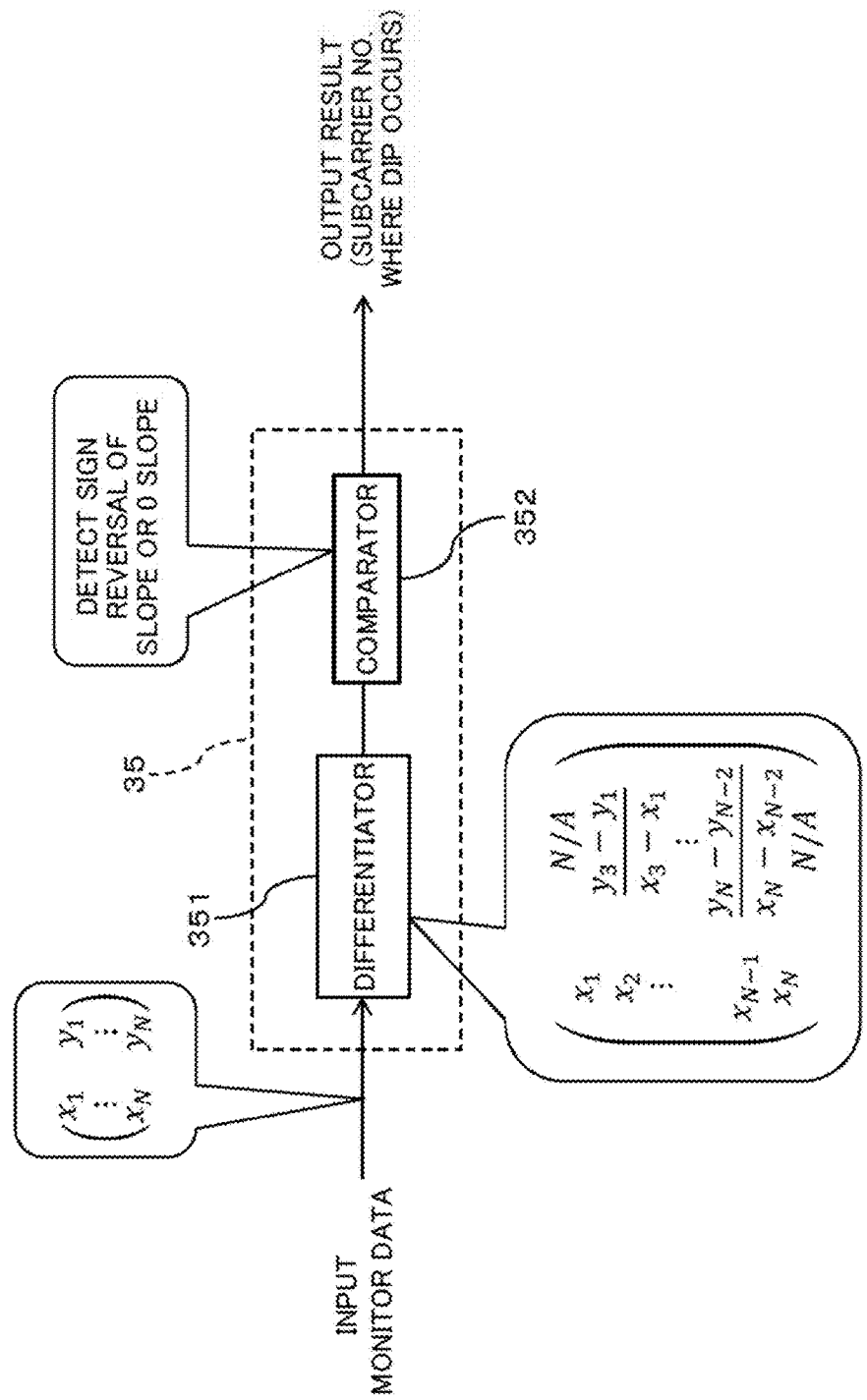
FIG. 10 is a block diagram illustrating a exemplary configuration for detection example 1 of a monitor in the optical reception apparatus exemplified in FIG. 1.

FIG. 10 is a block diagram illustrating an exemplary configuration of the monitor 35. As illustrated in FIG. 10, the monitor 35 may include a differentiator 351 and a comparator 352.

It is assumed that the subcarrier is represented by $x_i$ (i is one of 1 to N) and that the detected reception characteristic (for example, SNR) of each subcarrier is represented by $y_i$. In this case, a matrix of N rows and two columns represented as Formula 3 set out below is input to the differentiator 351 as monitor data.

$$\begin{pmatrix} x_1 & y_1 \\ \vdots & \vdots \\ x_N & y_N \end{pmatrix} \quad \text{[Formula 3]}$$

The number (N) of subcarriers ($x_i$) may be a value obtained by powers of 2 such as 64, 256, and 1024, for example.

Figure 11:
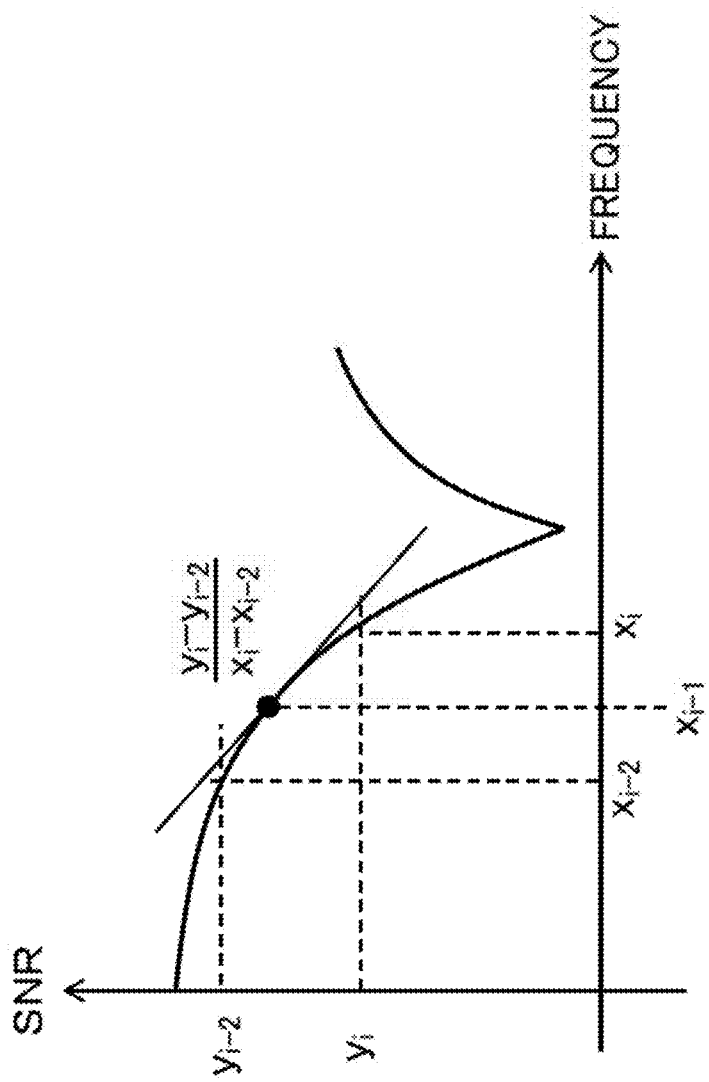
FIG. 11 is a schematic diagram illustrating the detection example 1 of the frequency dip by the monitor with the configuration illustrated in FIG. 10.

As illustrated in FIG. 11, the differentiator 351 calculates a change in the SNR with respect to the subcarriers by comparing SNR ($y_{i-2}$ and $y_i$) between neighboring subcarriers ($x_{i-2}$ and $x_i$) on both sides of a specific subcarrier ($x_{i-1}$) with a variable of the subcarrier number "i". The "change" of SNR with respect to the subcarriers may also be referred to a "slope". The "slope" may be calculated as an average value. The calculation of the "slope" can illustratively be represented by Formula 4 set out below. "N/A" is an abbreviation of "not available".

$$\begin{pmatrix} x_1 & N/A \\ x_2 & \frac{y_3 - y_1}{x_3 - x_1} \\ \vdots & \vdots \\ x_{N-1} & \frac{y_N - y_{N-2}}{x_N - x_{N-2}} \\ x_N & N/A \end{pmatrix} \quad [\text{Formula 4}]$$

In the above example, the SNR between two subcarriers interposed with one subcarrier therebetween is compared, but the number of subcarriers interposed therebetween to determine the slope is not limited to one. The slope may be determined by comparing SNR between subcarriers interposed with two or more subcarriers therebetween. However, when the number of subcarriers interposed therebetween is increased excessively, it is not available to detect the the slope accurately. Thus, the number of subcarriers interposed therebetween may appropriately be set within a range in which the slope can be detected accurately.

The comparator 352 may compare calculated slope values to determine a subcarrier at which the sign of slope value is reversed or a subcarrier whose slope value is "0" as a subcarrier at which a frequency dip occurs (in other words, the center frequency of a frequency dip). The subcarrier number of the subcarrier determined as involving the frequency dip is output to the calculator 36.

In the detection example 1 described above, the monitor 35 is available to reliably detect the subcarrier number corresponding to the frequency dip with a simple configuration.

(Detection Example 2 of the Frequency Dip by the Monitor)

In the detection example 1 of the frequency dip described above, the "slope" of SNR for the subcarriers is calculated using parameters of the subcarrier ($x_i$) and SNR ($y_i$) for each subcarrier.

Figure 12:
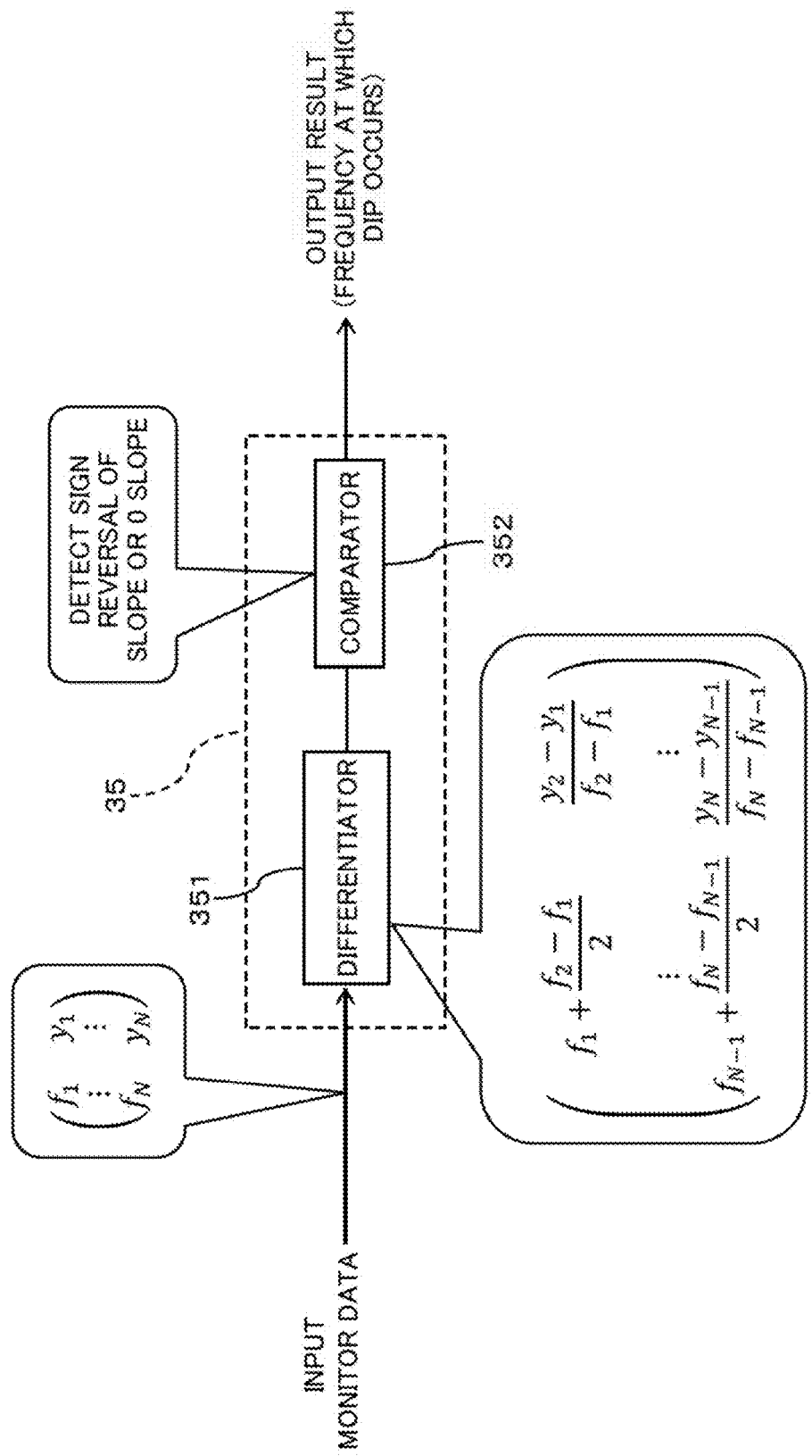
FIG. 12 is a block diagram illustrating an exemplary configuration for detection example 2 of the monitor in the optical reception apparatus illustrated in FIG. 1.
Figure 13:
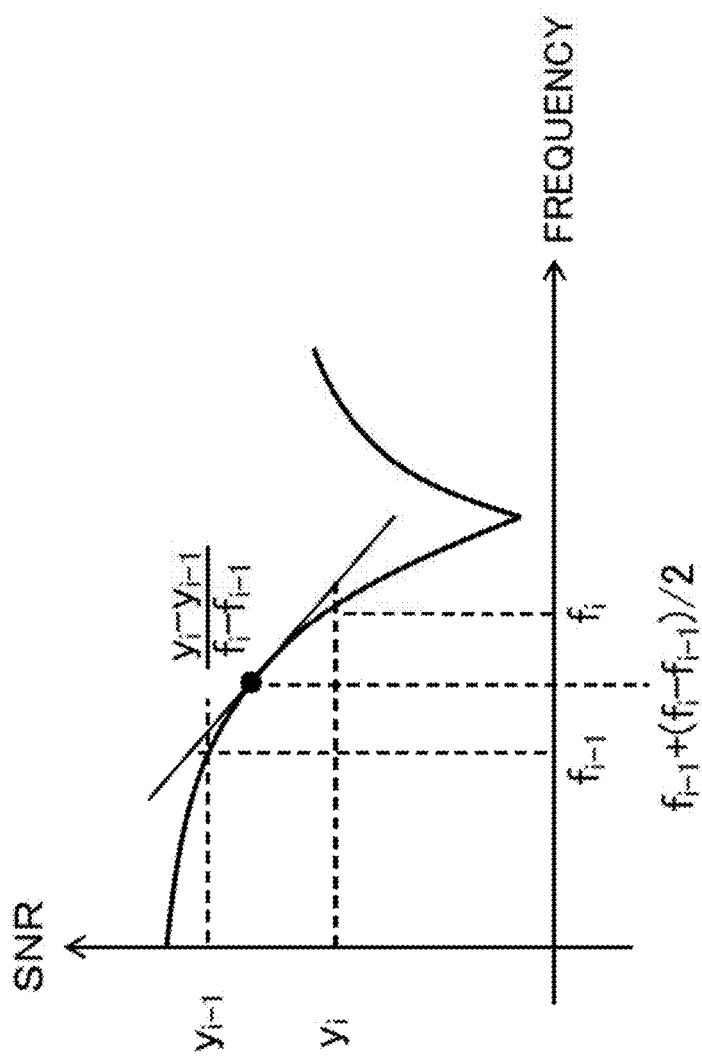
FIG. 13 is a schematic diagram illustrating the detection example 2 of the frequency dip by the monitor with the configuration illustrated in FIG. 12.

Meanwhile, in the detection example 2, as illustrated in FIGS. 12 and 13, a frequency ($f_i$) in the DMT transmission band and the SNR ($y_i$) at each frequency ($f_i$) may be used as parameters to calculate the "slope" of SNR for the frequencies. The frequencies $f_1$ to $f_N$ may be arranged with equal intervals in the frequency domain, but an arrangement with unequal intervals may be applicable.

In the detection example 2, a matrix of N rows and two columns represented as Formula 5 set out below is input into the differentiator 351 as monitor data, for example.

$$\begin{pmatrix} f_1 & y_1 \\ \vdots & \vdots \\ f_N & y_N \end{pmatrix} \quad [\text{Formula 5}]$$

As illustrated in FIG. 13, the differentiator 351 calculates a change (in other words, slope) in the SNR with respect to the frequencies by comparing the SNR ($y_{i-1}$ and $y_i$) between two neighboring frequencies ($f_{i-1}$ and $f_i$) with a variable of the frequency number "i". The "slope" may be calculated as an average value. The calculation of the "slope" can be represented by Formula 6 set out below, for example.

$$\begin{pmatrix} f_1 + \frac{f_2 - f_1}{2} & \frac{y_2 - y_1}{f_2 - f_1} \\ \vdots & \vdots \\ f_{N-1} + \frac{f_N - f_{N-1}}{2} & \frac{y_N - y_{N-1}}{f_N - f_{N-1}} \end{pmatrix} \quad [\text{Formula 6}]$$

The comparator 352 may compare calculated slope values to determine a frequency at which the sign of slope value is reversed or a frequency whose slope value is "0" as a frequency at which a frequency dip occurs (in other words, the center frequency of the frequency dip). The frequency determined as involving the frequency dip is output to the calculator 36.

Also in the detection example 2 described above, the monitor 35 is available to reliably detect the center frequency of the frequency dip with a simple configuration.

(Detection Example 3 of the Frequency Dip by the Monitor)

In the detection examples 1 and 2 described above, a change (in other words, slope) in the SNR with respect to the subcarriers or frequencies is calculated by the differentiator 351. In the detection example 3, the "slope" may be determined by sequentially comparing input monitor data without using the differentiator 351.

Figure 14:
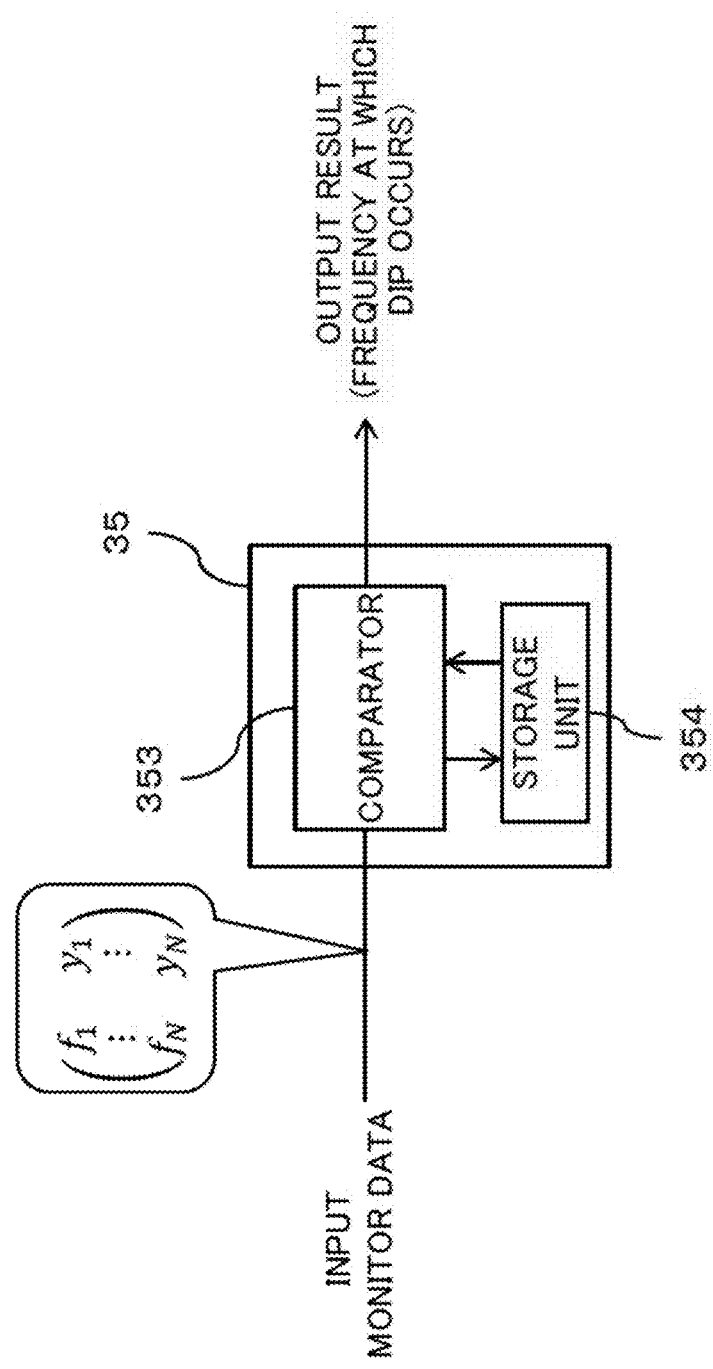
FIG. 14 is a block diagram illustrating an exemplary configuration for detection example 3 of the monitor in the optical reception apparatus illustrated in FIG. 1.

For example, the monitor 35 in the detection example 3 may include, as illustrated in FIG. 14, a comparator 353 and a storage unit 354. Monitor data input into the comparator 353 may be a matrix of the subcarriers ($x_i$) and the SNR ($y_i$) represented by Formula 3 in the detection example 1 or a matrix of the frequencies ($f_i$) and the SNR ($y_i$) represented by Formula 5 in the detection example 2.

Figure 15:
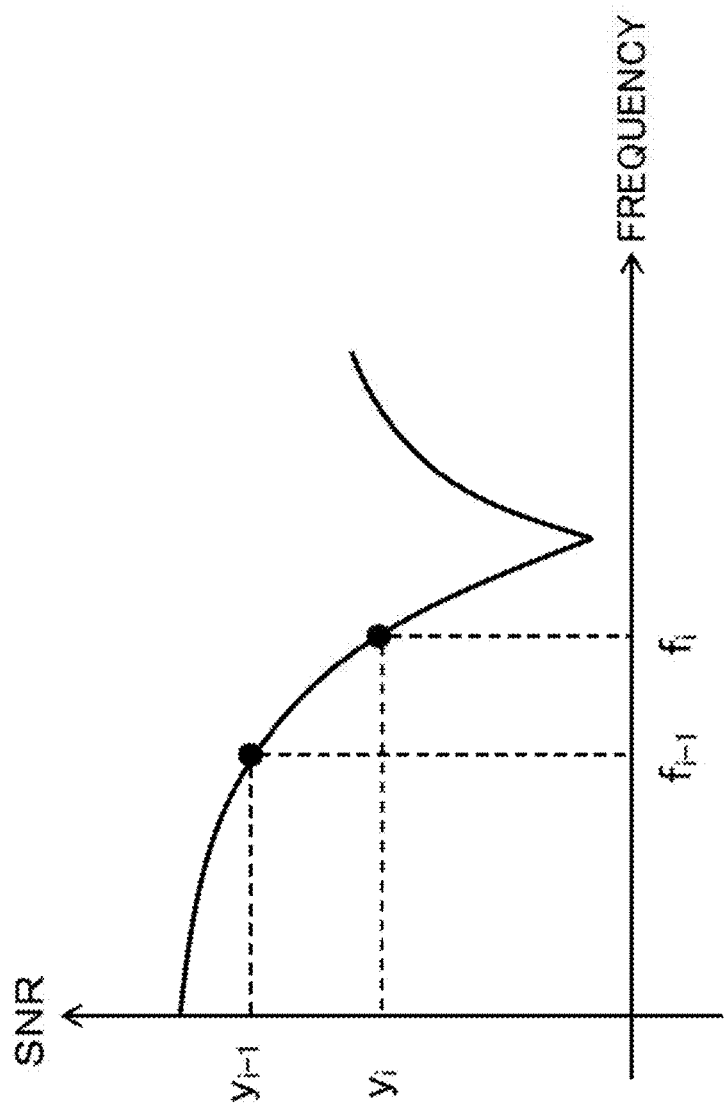
FIG. 15 is a schematic diagram illustrating the detection example 3 of the frequency dip by the monitor with the configuration illustrated in FIG. 14.
Figure 16:
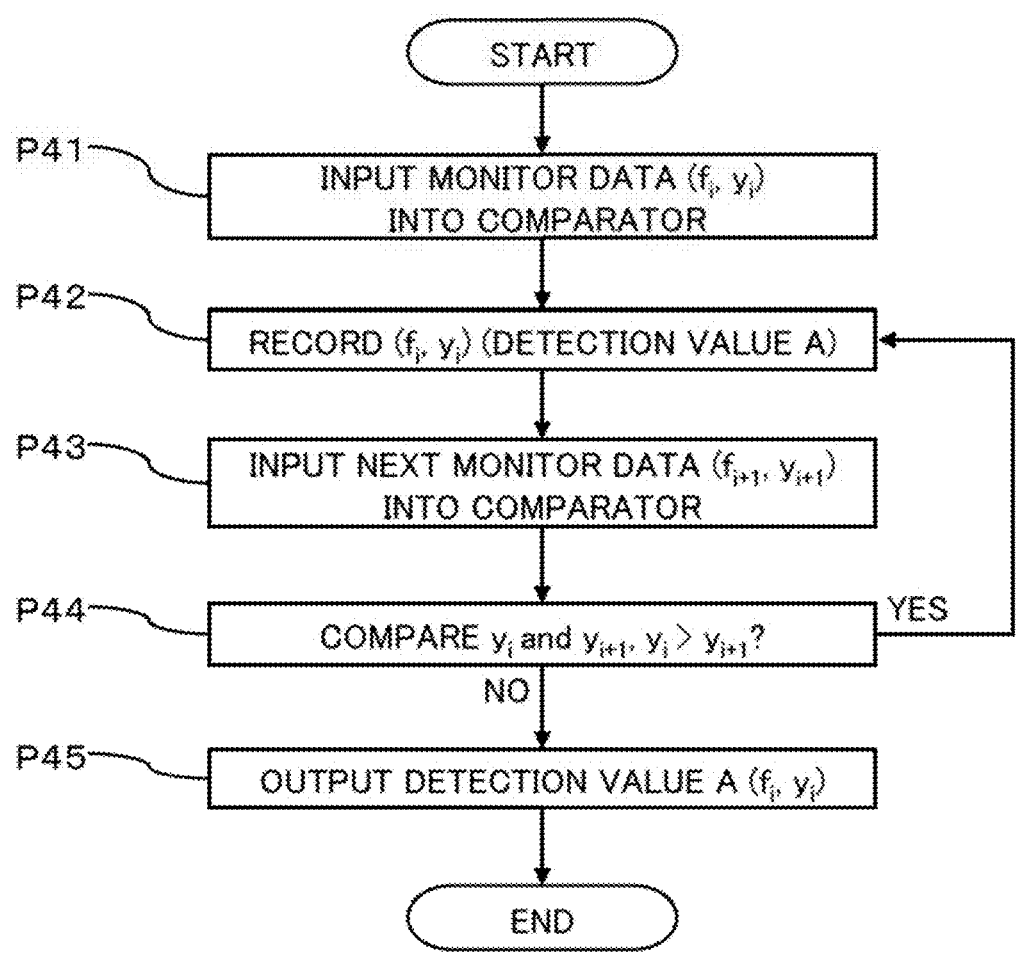
FIG. 16 is a flow chart illustrating the detection example 3 of the frequency dip by the monitor with the configuration illustrated in FIG. 14.

The comparator 353 may detect, as illustrated in FIGS. 15 and 16, the minimum value of the SNR ($y_i$) by sequentially comparing the SNR ($y_i$) while storing monitor data successively input to the monitor 35 in the storage unit 354.

For example, when monitor data ($f_i$, $y_i$) is input to the comparator 353 (processing P41), the comparator 353 stores the monitor data ($f_i$, $y_i$) in the storage unit 354 as a detection value A (processing P42).

After that, when the next monitor data ($f_{i+1}$, $y_{i+1}$) is input to the comparator 353 (processing P43), the comparator 353 compares SNR ($y_i$) stored in the storage unit 354 with the current input SNR ($y_{i+1}$) to determine whether $y_i > y_{i+1}$ is satisfied (processing P44).

When $y_i > y_{i+1}$ is satisfied (YES in processing P44), the comparator 353 stores the current monitor data ($f_{i+1}$, $y_{i+1}$) in the storage unit 354 (in other words, the detection value A is updated with the new monitor data). The above comparison and storage are repeated until $y_i \leq y_{i+1}$ (NO) is determined in processing P44.

When NO is determined in processing P44, the comparator 353 outputs the frequency (or the subcarrier number) of the detection value A stored in the storage unit 354 at the time to the calculator 36 (processing P45).

The frequency (or the subcarrier number) corresponds to the minimum value of the SNR and the frequency (or the subcarrier No.) determined as involving a frequency dip.

(Modification of the Detection Example 3)

Figure 17:
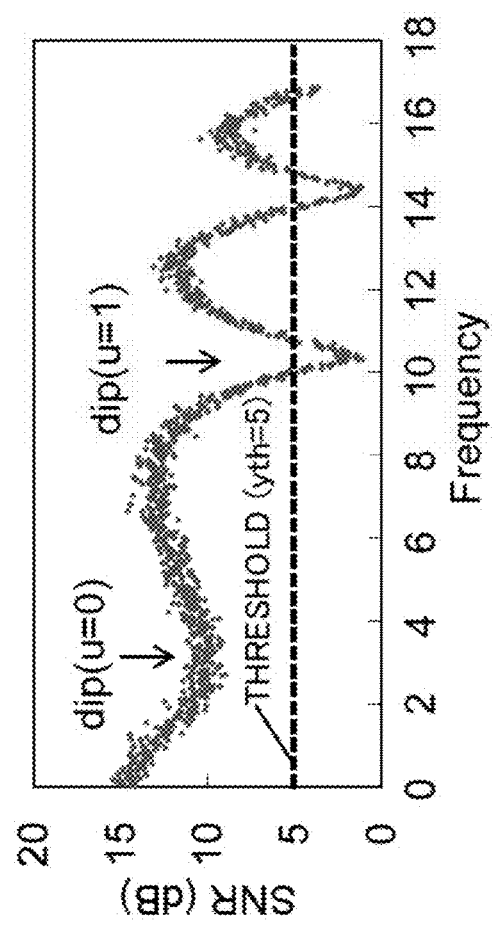
FIG. 17 is a diagram illustrating a case where a plurality of frequency dips occurs to describe a modification of the detection example 3 illustrated in FIGS. 14 to 16.

The monitor 35 configured as illustrated in FIG. 14 is also available in a case where a plurality of frequency dips occur in the DMT transmission band. As illustrated in FIG. 17, it is assumed that a frequency dip of u=0 and a frequency dip of u=1 occur in the DMT transmission band.

In the example of FIG. 17, the frequency dip of u=0 has a gradual dip of the SNR in comparison with the frequency dip of u=1. Thus, the detection accuracy of the center frequency may deteriorate in comparison with that of the frequency dip of u=1.

Thus, the frequency dip of u=0 may be excluded from detection candidates of the center frequency, for example. A determination with a threshold may be used to exclude a certain frequency dip from detection candidates. FIG. 17 illustrates an example in which the threshold $y_{th}$ for SNR is set to 5 [dB].

In FIG. 17, since the frequency dip of u=0 exceeds the threshold $y_{th}$=5 [dB], it may be excluded from the detection candidates. Meanwhile, since the frequency dip of u=1 is equal to or less than the threshold $y_{th}$, it is included in the detection candidates.

The calculator 36 (see FIG. 1) is available to determine a residual dispersion value (DL) corresponding to the center frequency $f_u$ (=$f_1$) of the frequency dip of u=1 by assigning u=1 in Formula 2 described above.

Figure 18:
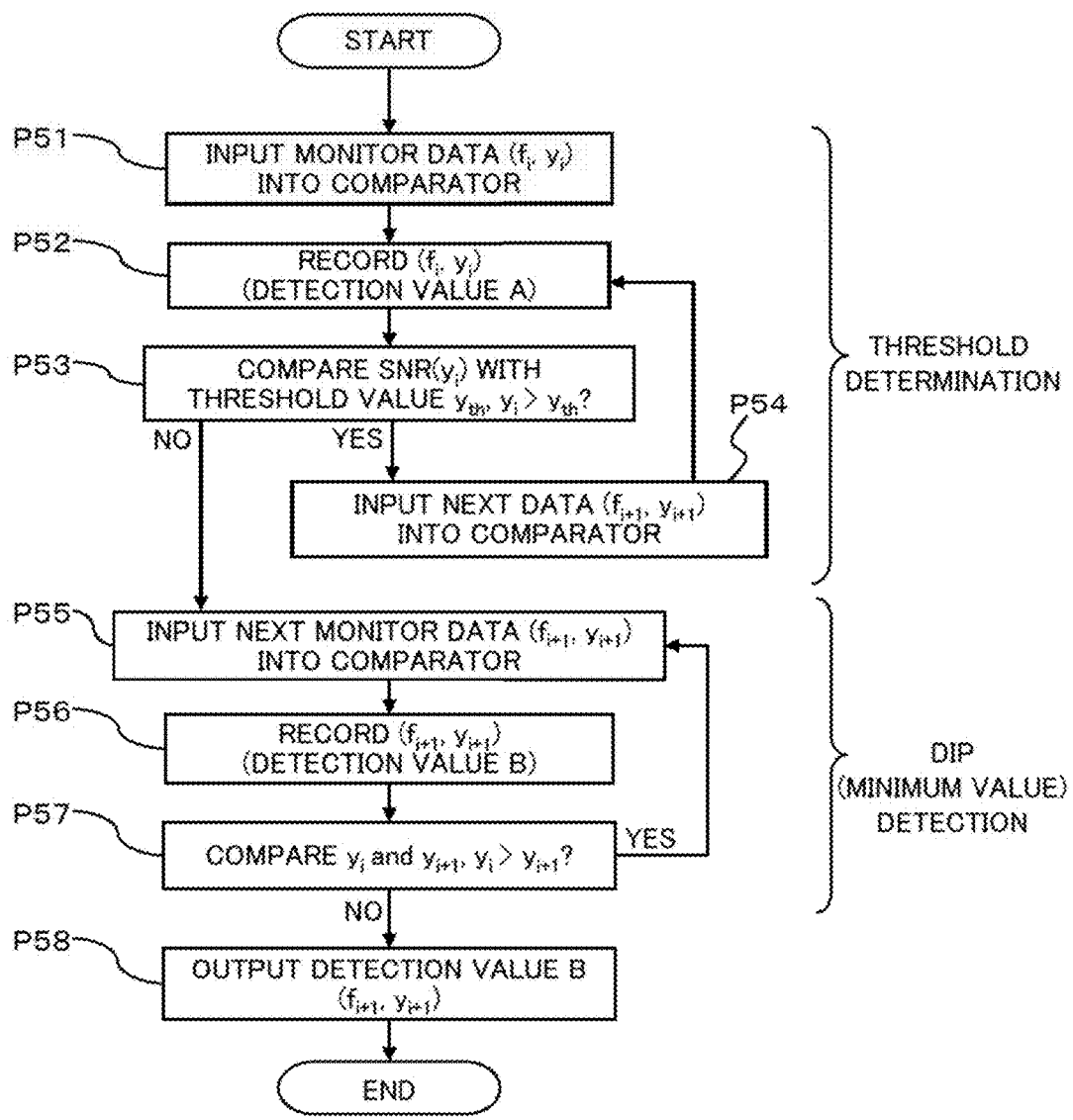
FIG. 18 is a flow chart illustrating the modification of the detection example 3.

FIG. 18 illustrates an exemplary operation of the monitor 35 (see FIG. 14) in a case where a plurality of frequency dips occurs in the DMT transmission band.

As illustrated in FIG. 18, when monitor data ($f_i$, $y_i$) is input to the comparator 353 (processing P51), the comparator 353 stores the monitor data ($f_i$, $y_i$) in the storage unit 354 as a detection value A (processing P52).

The comparator 353 also compares the SNR ($y_i$) of the input monitor data with the threshold ($y_{th}$) to determine whether $y_i$>$y_{th}$ is satisfied (processing P53).

As a result of the threshold determination, when $y_i$>$y_{th}$ is satisfied (YES in processing P53), the current input monitor data may be excluded from the detection candidates of the frequency dip, and thus, the next monitor data ($f_{i+1}$, $y_{i+1}$) is input to the comparator 353 (processing P54).

The comparator 353 repeats the storage of input monitor data in the storage unit 354 and the determination using the threshold until monitor data which satisfies $y_i$≤$y_{th}$ is input (until NO is determined in processing P53). In other words, the detection value A in the storage unit 354 is sequentially updated with new monitor data until monitor data to be a detection candidate of a frequency dip is input.

When $y_i$≤$y_{th}$ is satisfied in processing P53 (NO in processing P53), the comparator 353 detects monitor data input thereafter, which yields the minimum value of SNR, for example (processing P55 to P58).

For example, the comparator 353 stores monitor data ($f_{i+1}$, $y_{i+1}$) input after $y_i$≤$y_{th}$ is satisfied in the storage unit 354 as a detection value B (processing P55 and P56). When the SNR ($y_i$) stored as the detection value B is present, the comparator 353 compares the SNR ($y_i$) with the next input SNR ($y_{i+1}$) to determine whether $y_i$>$y_{i+1}$ is satisfied (processing P57).

When $y_i$>$y_{i+1}$ is satisfied (YES in processing P57), the comparator 353 stores the next monitor data ($f_{i+1}$, $y_{i+1}$) as a new detection value B in the storage unit 354 (in other words, the detection value B is updated with the new monitor data). The above comparison and storage are repeated until $y_i$≤$y_{i+1}$ (NO) is determined in processing P57.

When NO is determined in processing P57, the comparator 353 outputs the frequency (or the subcarrier number) of the detection value B stored in the storage unit 354 at the time to the calculator 36 (processing P58).

The frequency (or the subcarrier number) corresponds to the minimum value of SNR of monitor data among detection candidates detected by the determination using the threshold, and involves a frequency dip.

As described above, even when a plurality of frequency dips occurs in the DMT transmission band, it is possible to improve a detection accuracy of a frequency dip by using the determination with the threshold. As a result, it is also improve a control accuracy of the dispersion compensation quantity of the tunable dispersion compensator 31 by the controller 37. Therefore, it is possible to enhance a reliability for increasing the transmission capacity in the DMT transmission band.

(Second Embodiment)

Figure 19:
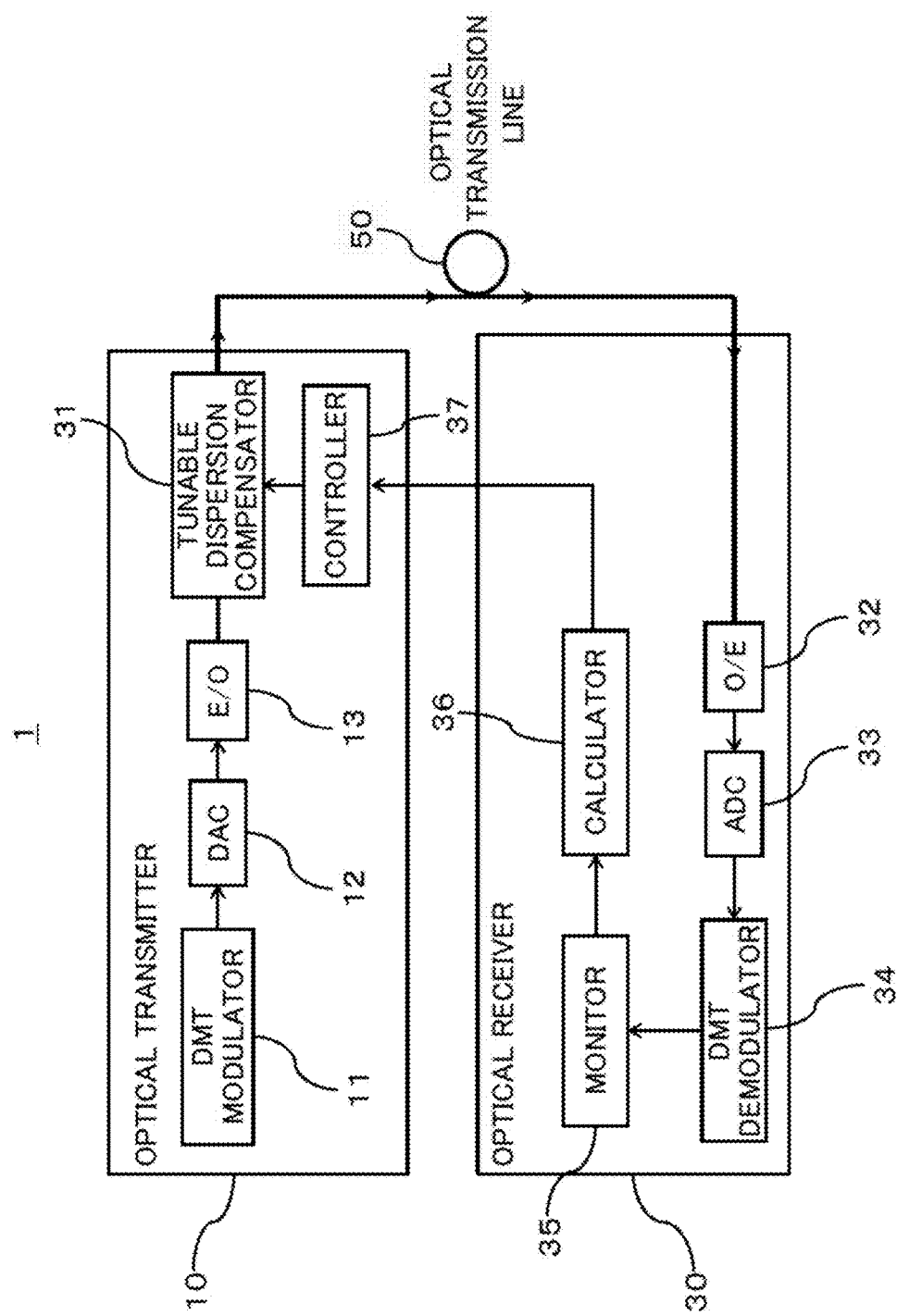
FIG. 19 is a block diagram illustrating another exemplary configuration of a multi-carrier optical transmission system applied with the DMT modulation scheme according to a second embodiment.

FIG. 19 is a block diagram illustrating another exemplary configuration of the multi-carrier optical transmission system applied with the DMT modulation scheme according to a second embodiment. The multi-carrier optical transmission system 1 illustrated in FIG. 19 is different from the configuration illustrated in FIG. 1 in that the tunable dispersion compensator 31 and the controller 37 are provided in the optical transmitter 10 instead of the optical receiver 30.

In other words, while the dispersion compensation for the received DMT modulated signal light is performed in the optical receiver 30 in the first embodiment, a dispersion compensation for a transmission DMT modulated signal light may be performed in the optical transmitter 10 in the second embodiment.

Thus, the calculator 36 of the optical receiver 30 may communicably be connected to the controller 37 of the optical transmitter 10 so that the residual dispersion value (DL) calculated based on the monitoring result of the monitor 35 can be transmitted to the controller 37.

The communication between the calculator 36 and the controller 37 may also be referred to as "control communication". The "control communication" is not particularly limited to a specific aspect. Optical communication may be applied to the "control communication", or other wire communication or wireless communication may also be applied to the "control communication".

(Operation Example)

Figure 20:
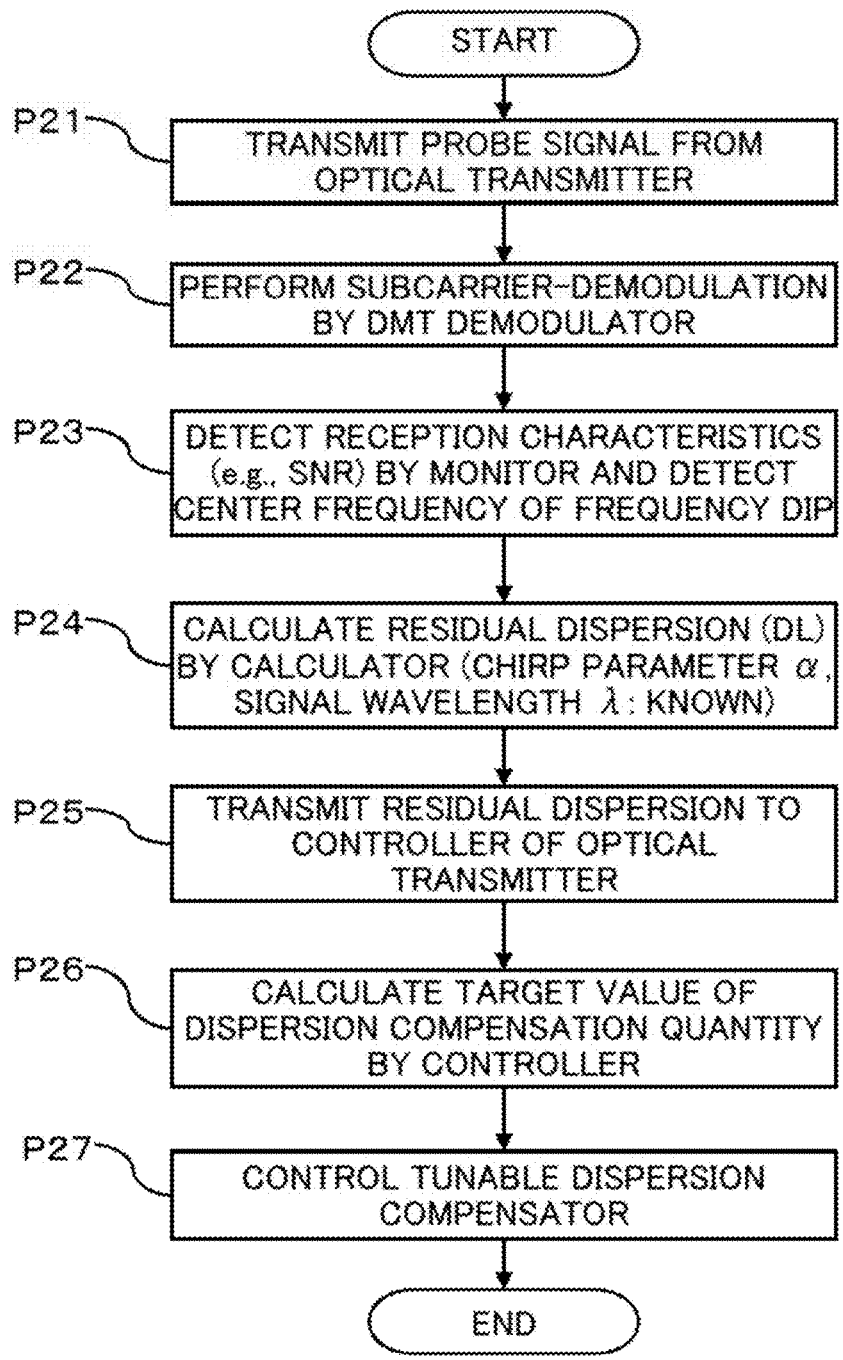
FIG. 20 is a flow chart illustrating an exemplary operation for a dispersion compensation control method of the multi-carrier optical transmission system illustrated in FIG. 19.

Hereinafter, an exemplary operation focusing on the frequency dip detection and dispersion compensation control in the multi-carrier optical transmission system 1 according to the second embodiment will be described with reference to the flow chart (processing P21 to P27) illustrated in FIG. 20.

The optical transmitter 10 generates a probe signal whose multi-level degree and power level are equal for each subcarrier by the DMT modulator 11. The probe signal is converted into an analog signal by the DAC 12. A drive signal according to the analog signal is provided from the DML driver to the DML in the E/O module 13 to generate probe signal light, and the generated probe signal light is transmitted to the optical transmission line 50 (processing P21). When the probe signal light is transmitted, the controller 37 may set the dispersion compensation quantity of the tunable dispersion compensator 31 to an initial value (for example, 0).

In the optical receiver 30, the probe signal light received from the optical transmission line 50 is converted into an electric signal by the O/E module 32, the electric signal is converted into a digital signal by the ADC 33, and the digital signal is demodulated with the subcarrier-demodulation by the DMT demodulator 34 (processing P22).

As illustrated in FIG. 4, each demodulated subcarrier signal is monitored by the monitor 35. The monitor 35 detects reception characteristics (for example, the SNR) of each subcarrier signal to detect the center frequency of a frequency dip based on the detection result (processing P23). Any one of the detection examples 1 to 3 illustrated in FIGS. 10 to 18 may be applied to a method of detecting a frequency dip by the monitor 35 in the second embodiment.

Based on the center frequency of the frequency dip detected by the monitor 35, the calculator 36 calculates a residual dispersion value (DL) based on Formula 2 described above (processing P24).

The calculator 36 transmits the calculated residual dispersion value to the controller 37 in the optical transmitter 10 with the control communication (processing P25).

In response to a reception of the residual dispersion value transmitted by the calculator 36 (processing P26), the controller 37 in the optical transmitter 10 determines a target value of the dispersion compensation quantity sufficient to deviate the frequency dip from the DMT transmission band.

Then, the controller 37 controls the dispersion compensation value of the tunable dispersion compensator 31 to the target value (processing P27).

With the above processing, similar to the first embodiment, no frequency dip occurs in reception characteristics in the DMT transmission band of the optical receiver 30. Thus, when an actual transmission signal alternative to the probe signal is transmitted, the optical transmitter 10 (e.g., DMT modulator 11) is allowed to allocate more transmission bits to the subcarrier where the frequency dip was occurred in the DMT transmission band in comparison with a case where the frequency dip is not deviated from the DMT transmission band.

Therefore, it is possible to eliminate or mitigate limitations to the transmission capacity due to the occurrence of a frequency dip in the DMT transmission band. Thus, it is possible to increase the transmission capacity of the DMT transmission band.

Additionally, in the second embodiment, since the dispersion compensation for the DMT modulated signal light to be transmitted is performed in the optical transmitter 10, it is also possible to mitigate the degree of non-linear optical effect given to the DMT modulated signal light transmitted through the optical transmission line 50 in comparison with the first embodiment.

In other words, the waveform of the DMT modulated signal light to be transmitted is preliminarily changed by the dispersion compensation performed in the optical transmitter 10 to decrease the peak power of the DMT modulated signal light. Thus, it is possible to mitigate the degree of non-linear optical effect in the second embodiment in view of a qualitative tendency.

The non-linear optical effect is easy to occur under "non-linear transmission conditions" such as high peak power of transmission light and a long transmission distance. Thus, the second embodiment may be considered as being useful for transmission under such "nonlinear transmission conditions".

In the second embodiment, similar to the first embodiment, the multi-staged tunable dispersion compensators 31 may be provided in the optical transmitter 10 according to a dispersion compensation quantity to be achieved.

In the example of FIG. 19, when compared with the configuration illustrated in FIG. 1, the tunable dispersion compensator 31 and the controller 37 are moved to the optical transmitter 10. Additionally, the calculator 36 may also be moved to the optical transmitter 10. Alternatively, the tunable dispersion compensator 31 may be moved to the optical transmitter 10 while the calculator 36 and the controller 37 are retained in the optical receiver 30. In any cases, it is enough to be able to provide information such as monitoring results and calculation results from the optical receiver 30 to the optical transmitter 10 with the control communication between the optical receiver 30 and the optical transmitter 10.

In other words, the tunable dispersion compensator 31 provided in the optical transmitter 10 is enough to be controlled its dispersion compensation quantity based on monitoring results of the monitor 35 provided in the optical receiver 30. The function or the circuit to control the dispersion compensation quantity may be provided in the optical transmitter 10 or the optical receiver 30 or may be distributed over the optical transmitter 10 and the optical receiver 30.

When the function or the circuit to control the dispersion compensation quantity of the tunable dispersion compensator 31 is provided in the optical receiver 30, the dispersion compensation quantity of the tunable dispersion compensator 31 provided in the optical transmitter 10 may be controlled by the function or the circuit through the control communication.

(Third Embodiment)

Figure 21:
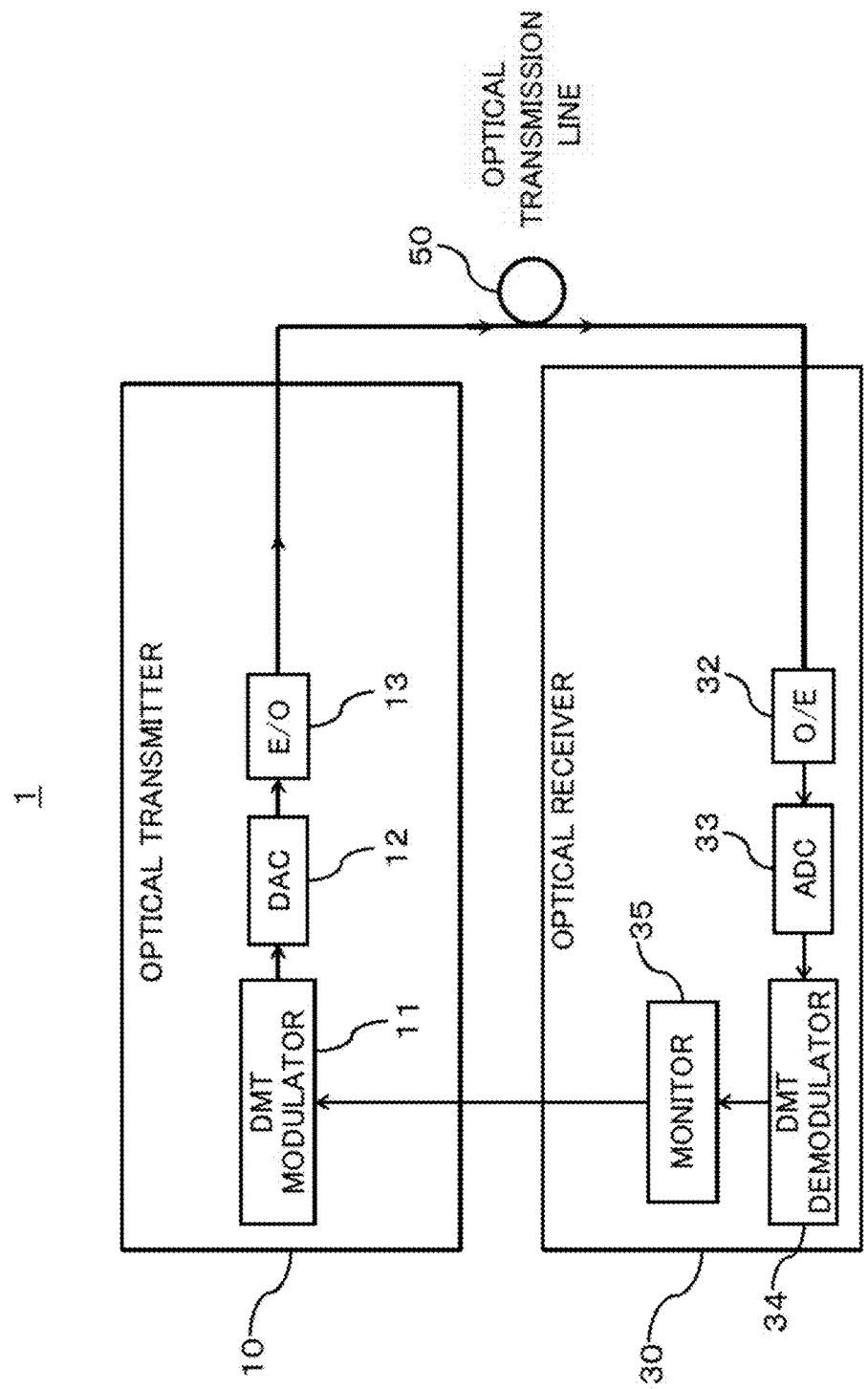
FIG. 21 is a block diagram illustrating an exemplary configuration of the multi-carrier optical transmission system applied with the DMT modulation scheme according to a third embodiment.

FIG. 21 is a block diagram illustrating an exemplary configuration of the multi-carrier optical transmission system applied with the DMT modulation scheme according to a third embodiment. The multi-carrier optical transmission system 1 illustrated in FIG. 21 is different from the configuration illustrated in FIG. 1 in that the calculator 36 and the controller 37 may be unavailable in the optical receiver 30.

Alternatively, the monitor 35 of the optical receiver 30 may communicably be connected to the DMT modulator 11 in the optical transmitter 10. The monitor 35 is available to transmit information indicative of the center frequency of a monitored frequency dip to the DMT modulator 11 through the control communication.

Based on the information indicative of the center frequency of the frequency dip received from the monitor 35, the DMT modulator 11 may increase (in other words, "pre-emphasize") the transmission power level of the subcarrier corresponding to the center frequency, for example.

Figure 22:
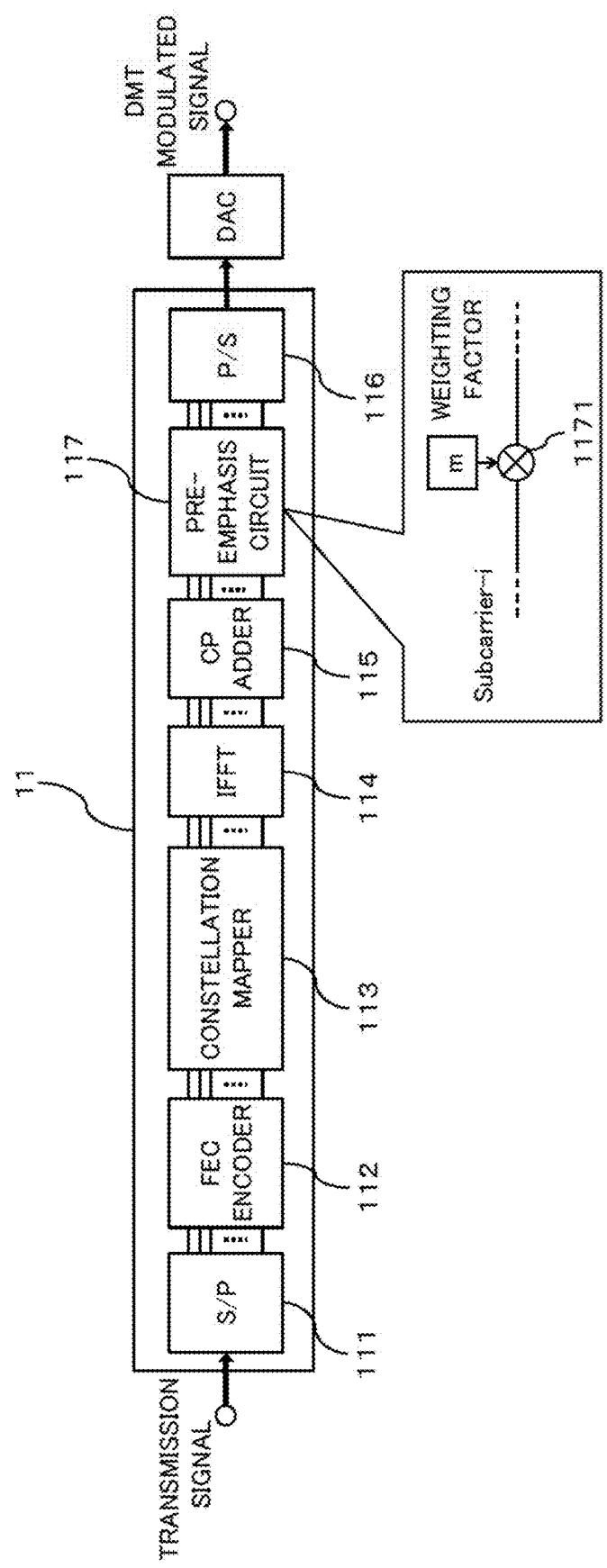
FIG. 22 is a block diagram illustrating an exemplary configuration of the DMT modulator in the optical transmission apparatus illustrated in FIG. 21.

Thus, the DMT modulator 11 in the third embodiment may include, as illustrated in FIG. 22, a pre-emphasis circuit 117 between the CP adder 115 and the P/S converter 116 illustrated in FIG. 2, for example.

The pre-emphasis circuit 117 may include a weighting factor multiplier 1171 for each subcarrier. With changing the weighting factor (m) multiplied to a subcarrier signal by the weighting factor multiplier 1171, the transmission power level can be changed for each subcarrier.

The pre-emphasis circuit 117 controls a weighting factor for a subcarrier corresponding to the center frequency of the frequency dip notified from the monitor 35 to a weighting factor which is available to prevent the frequency dip from being detected by the monitor 35 in the optical receiver 30.

In other words, the DMT modulator 11 in the third embodiment controls (in other words, pre-emphasizes) transmission power of the relevant subcarrier by digital signal processing such that the frequency dip detected by the monitor 35 in the optical receiver 30 is lost.

(Operation Example)

Hereinafter, an exemplary operation focusing on the frequency dip detection and dispersion compensation control of the multi-carrier optical transmission system 1 according to the third embodiment will be described with reference to the flow chart (processing P31 to P36) illustrated in FIG. 23.

The optical transmitter 10 generates a probe signal whose multi-level degree and power level are equal for each subcarrier by the DMT modulator 11. The probe signal is converted into an analog signal by the DAC 12. A drive signal according to the analog signal is provided from the DML driver to the DML in the E/O module 13 to generate probe signal light, and the generated probe signal light is transmitted to the optical transmission line 50 (processing P31).

In the optical receiver 30, the probe signal light received from the optical transmission line 50 is converted into an electric signal by the O/E module 32, the electric signal is converted into a digital signal by the ADC 33, and the digital signal is demodulated with the subcarrier-demodulation by the DMT demodulator 34 (processing P32).

As illustrated in FIG. 4, each demodulated subcarrier signal is monitored by the monitor 35. The monitor 35 detects reception characteristics (for example, the SNR) of each subcarrier signal to detect the center frequency of a frequency dip based on the detection result and the degree of dip (may also be referred to as a "dip depth" or "dip level") (processing P33). Any detection examples 1 to 3 illustrated in FIGS. 10 to 18 may be applied to the method of detecting a frequency dip by the monitor 35 in the third embodiment.

The monitor 35 transmits information indicative of the detected center frequency and the dip depth to the DMT modulator 11 in the optical transmitter 10 (processing P34).

In response to a reception of the information indicative of the detected center frequency and the dip depth from the optical receiver 30 (processing P35), the DMT modulator 11 pre-emphasizes transmission power of the subcarrier corresponding to the center frequency by the pre-emphasis circuit 117 (processing P36).

For example, the pre-emphasis circuit 117 controls the weighting factor (m) of the weighting factor multiplier 1171 such that the frequency dip detected by the monitor 35 is lost. In other words, the DMT modulator 11 generates a DMT modulated signal in which a weight of transmission power corresponding to the dip depth is assigned to the relevant subcarrier involving the frequency dip.

With the above pre-emphasis for each subcarrier, it is possible to prevent the occurrence of frequency dip or to suppress the frequency dip in reception characteristics in the DMT transmission band of the optical receiver 30. Thus, when an actual transmission signal alternative to the probe signal is transmitted, the optical transmitter 10 (e.g., DMT modulator 11) is allowed to allocate more transmission bits to the subcarrier where the frequency dip was occurred in the DMT transmission band in comparison with a case where the pre-emphasis is not performed.

Therefore, it is possible to eliminate or mitigate limitations to the transmission capacity due to the occurrence of the frequency dip in the DMT transmission band. Thus, it is possible to increase the transmission capacity in the DMT transmission band. For the optical receiver 30, since no frequency dip occurs or any frequency dips can be mitigated in the DMT transmission band, it is possible to improve reception characteristics.

According to the above technology, it is possible to increase the transmission capacity in a transmission band of a multi-carrier modulation scheme.

All examples and conditional language provided herein are intended for pedagogical purposes to aiding the reader in understanding the intention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical reception apparatus to receive a multi-carrier modulated signal light modulated by a multi-carrier modulation scheme available to allocate different transmission conditions for each of a plurality of subcarriers in accordance with transmission characteristics of the plurality of subcarriers, the optical reception apparatus comprising:
a receiver configured to receive from an optical transmission line a training signal light allocated with the same transmission conditions for each of the plurality of subcarriers;
a monitor configured to monitor the transmission characteristics of the training signal light to detect a frequency at which a dip of the transmission characteristics occurs; and
a controller configured to control, based on the detected frequency, a dispersion compensation for the multi-carrier modulated signal light having received a dispersion from the optical transmission line, wherein the monitor comprises:
a differentiator configured to differentiate the transmission characteristics of the training signal light by a frequency to detect a change of the transmission characteristics to the frequency, and
a comparator configured to detect a frequency at which a sign of the change is reversed or a frequency at which the change is zero as the frequency at which the dip of the transmission characteristics occurs by comparing differentiation results of the differentiator.

2. The optical reception apparatus according to claim 1, further comprising
a tunable dispersion compensator configured to compensate for the dispersion of the multi-carrier modulated signal light received from the optical transmission line with a tunable dispersion compensation quantity for output to the receiver, wherein
the controller
controls the dispersion compensation quantity of the tunable dispersion compensator such that the detected frequency deviates from a transmission band of the multi-carrier modulated signal light.

3. The optical reception apparatus according to claim 1, wherein the controller
includes a calculator configured to calculate a dispersion quantity of the training signal light received from the optical transmission line based on the detected frequency, a wavelength of the training signal light, and a frequency chirp parameter of an optical transmission apparatus that has transmitted the training signal light.

4. The optical reception apparatus according to claim 1, wherein the controller
controls a dispersion compensation quantity of a tunable dispersion compensator provided in an optical transmission apparatus that has transmitted the training signal light to compensate for the dispersion of the optical transmission line with the tunable dispersion compensation quantity based on the detected frequency.

5. The optical reception apparatus according to claim 1, wherein the monitor includes:
a storage configured to store the transmission characteristics for each of the plurality of subcarriers of the training signal light and
the comparator configured to detect a frequency corresponding to a subcarrier for which the transmission characteristics indicates a minimum value as the frequency at which the dip of the transmission characteristics occurs by comparing the transmission characteristics stored in the storage.

6. A multi-carrier optical transmission system comprising:
an optical transmitter configured to transmit to an optical transmission line a multi-carrier modulated signal light modulated by a multi-carrier modulation scheme available to allocate different transmission conditions for each of a plurality of subcarriers in accordance with transmission characteristics of the plurality of subcarriers;
an optical receiver configured to receive the multi-carver modulated signal light from the optical transmission line;
a tunable dispersion compensator provided in the optical receiver or the optical transmitter and configured to compensate for dispersion of the optical transmission line with a tunable dispersion compensation quantity;
a monitor provided in the optical receiver and configured to monitor the transmission characteristics of a training signal light transmitted to the optical transmission line by the optical transmitter, the training signal being allocated with the same transmission conditions for each of the plurality of subcarriers, to detect a frequency at which a dip of the transmission characteristics occurs; and a controller configured to control a dispersion compensation quantity of the tunable dispersion compensator based on the detected frequency, wherein the monitor comprises:

a differentiator configured to differentiate the transmission characteristics of the training signal light by a frequency to detect a change of the transmission characteristics to the frequency and
a comparator configured to detect a frequency at which a sign of the change is reversed or a frequency at which the change is zero as the frequency at which the dip of the transmission characteristics occurs by comparing differentiation results of the differentiator.

7. A method of controlling a dispersion compensation, the method comprising:
transmitting a training signal light allocated with the same transmission conditions for each of a plurality of subcarriers to an optical transmission line by an optical transmitter of a multi-carrier modulation scheme available to allocate different transmission conditions for each of the plurality of subcarriers in accordance with transmission characteristics of the plurality of subcarriers;
detecting a frequency at which a dip of the transmission characteristics occurs by monitoring the transmission characteristics of the training signal light in an optical receiver, and
controlling, based on the detected frequency, the dispersion compensation for a multi-carrier modulated signal light which receives a dispersion from the optical transmission line, wherein
the detecting comprising:
differentiating the transmission characteristics of the training signal light by a frequency to detect a change of the transmission characteristics to the frequency and
detecting a frequency at which a sign of the change is reversed or a frequency at which the change is zero as the frequency at which the dip of the transmission characteristics occurs by comparing differentiation results of a differentiator.

* * * * *